US011886189B2

(12) United States Patent
Karachalios et al.

(10) Patent No.: US 11,886,189 B2
(45) Date of Patent: Jan. 30, 2024

(54) CONTROL AND NAVIGATION SYSTEMS, POSE OPTIMIZATION, MAPPING, AND LOCALIZATION TECHNIQUES

(71) Applicant: PERCEPTUAL ROBOTICS LIMITED, Bristol (GB)

(72) Inventors: Konstantinos Karachalios, Bristol (GB); Dimitrios Nikolaidis, Bristol (GB); Kevin Driscoll-Lind, Bristol (GB); Colin Greatwood, Bristol (GB); Andrew Calway, Bristol (GB); Oliver Moolan-Feroze, Bristol (GB)

(73) Assignee: PERCEPTUAL ROBOTICS LIMITED, Bristol (GB)

( * ) Notice: Subject to any disclaimer, the term of this patent is extended or adjusted under 35 U.S.C. 154(b) by 376 days.

(21) Appl. No.: 17/274,386

(22) PCT Filed: Sep. 10, 2019

(86) PCT No.: PCT/GB2019/052521
§ 371 (c)(1),
(2) Date: Mar. 8, 2021

(87) PCT Pub. No.: WO2020/053573
PCT Pub. Date: Mar. 19, 2020

(65) Prior Publication Data
US 2022/0050461 A1 Feb. 17, 2022

(30) Foreign Application Priority Data

Sep. 10, 2018 (GR) .............................. 20180100410
Sep. 28, 2018 (GB) ..................................... 1815864
(Continued)

(51) Int. Cl.
*G05D 1/00* (2006.01)
*G06T 7/73* (2017.01)
(Continued)

(52) U.S. Cl.
CPC ......... *G05D 1/0094* (2013.01); *B64C 39/024* (2013.01); *G05D 1/0088* (2013.01);
(Continued)

(58) Field of Classification Search
CPC ...... G05D 1/0094; G05D 1/0088; G06T 7/73; G06T 7/0014; G06T 7/55; G06T 7/75;
(Continued)

(56) References Cited

U.S. PATENT DOCUMENTS

| 9,342,888 B2 | 5/2016 | Menashe et al. |
| 9,434,473 B2 | 9/2016 | Peeters et al. |

(Continued)

FOREIGN PATENT DOCUMENTS

| CN | 103528568 A | 1/2014 |
| CN | 105180963 A | 12/2015 |

(Continued)

OTHER PUBLICATIONS

Stokkeland et al.; Autonomous visual navigation of unmanned aerial vehicle for wind turbine inspection; 2015 International Conference on Unmanned Aircraft Systems (ICUAS); Denver Marriott Tech Center Denver, Colorado, USA; Jun. 9-12, 2015; pp. 998-1007 (Year: 2015).*

(Continued)

*Primary Examiner* — Michael J Zanelli
(74) *Attorney, Agent, or Firm* — Talem IP Law, LLP

(57) ABSTRACT

A navigation program for an autonomous vehicle, the navigation program configured to: receive an initial model of an object to be inspected by the autonomous vehicle; identify an inspection target associated with the initial model of the object; and determine an inspection location for the autonomous vehicle from which inspection target is inspectable by (Continued)

an inspection system of the autonomous vehicle, wherein the initial model includes one or more convex shapes representing the object.

15 Claims, 15 Drawing Sheets

(30) Foreign Application Priority Data

Feb. 13, 2019 (GR) .............................. 20190100076
Feb. 22, 2019 (GB) .................................... 1902475

(51) Int. Cl.
*B64C 39/02* (2023.01)
*G06V 10/82* (2022.01)
*B64U 101/30* (2023.01)

(52) U.S. Cl.
CPC ................ *G06T 7/73* (2017.01); *G06V 10/82* (2022.01); *B64U 2101/30* (2023.01); *B64U 2201/10* (2023.01)

(58) Field of Classification Search
CPC . G06T 2207/10032; G06T 2207/20081; G06T 2207/20084; G06T 2207/30164; G06T 2207/30244; G06T 2207/30252; G06V 10/82; G06V 20/17; G06V 20/176; B64U 2101/30; B64U 2101/10; Y02B 10/30; G08G 5/0026; G08G 5/0034; G08G 5/0039; G08G 5/0069; G08G 5/0086; G08G 5/0013; F03D 17/00
See application file for complete search history.

(56) References Cited

U.S. PATENT DOCUMENTS

| | | | |
|---|---|---|---|
| 2001/0043738 A1 | 11/2001 | Sawhney et al. | |
| 2008/0050012 A1 | 2/2008 | Oyama et al. | |
| 2014/0168420 A1 | 6/2014 | Naderhirn et al. | |
| 2017/0020664 A1 | 1/2017 | Thill et al. | |
| 2017/0199647 A1 | 7/2017 | Richman et al. | |
| 2017/0206648 A1 | 7/2017 | Marra et al. | |
| 2017/0228878 A1 | 8/2017 | Goldman et al. | |
| 2018/0003161 A1* | 1/2018 | Michini | F03D 17/00 |
| 2018/0149138 A1 | 5/2018 | Thiercelin et al. | |
| 2019/0228263 A1* | 7/2019 | Szeto | G02B 27/017 |
| 2020/0293045 A1* | 9/2020 | Ghiglino Novoa | F03D 17/00 |

FOREIGN PATENT DOCUMENTS

| | | | | |
|---|---|---|---|---|
| CN | 107013419 | A | 8/2017 | |
| CN | 107862744 | A | 3/2018 | |
| CN | 108015764 | A | 5/2018 | |
| CN | 108248842 | A | 7/2018 | |
| CN | 108415453 | A | 8/2018 | |
| GB | 2525900 | A | 11/2015 | |
| GB | 2561368 | A | 10/2018 | |
| WO | 0167749 | A2 | 9/2001 | |
| WO | 2015181827 | A1 | 12/2015 | |
| WO | 2017079321 | A1 | 5/2017 | |
| WO | 2018126083 | A1 | 7/2018 | |
| WO | 2019013736 | A1 | 1/2019 | |
| WO | WO-2019048596 | A1 * | 3/2019 | ........... B64C 39/024 |
| WO | 2020053560 | 1 | 3/2020 | |
| WO | 2020053573 | A1 | 3/2020 | |

OTHER PUBLICATIONS

Examination Report issued in Indian Application No. 202147006863, dated Jan. 13, 2022, 5 pages.
Examination Report issued in Indian Application No. 202147006876, dated Jan. 20, 2022, 5 pages.
Examination Report issued in United Kingdom Application No. GB1902475.1, dated Mar. 9, 2022, 2 pages.
Communication pursuant to Article 94(3) EPC issued in European Patent Office Application No. 19766337.0, dated Mar. 25, 2022, 5 pages.
Examination Report issued in Chinese Application No. 201980059299. 9, dated May 24, 2022, 16 pages.
Communication pursuant to Rule 164(2)(b) and Article 94(3) EPC issued in European Patent Office Application No. 19773145.8, dated Jun. 14, 2022, 12 pages.
Communication pursuant to Article 94(3) EPC issued in European Patent Office Application No. 19766337.0, dated Dec. 15, 2022, 6 pages.
Julien Li-Chee-Ming et al. "UAV navigation system using line-based sensor pose estimation" Geo-spatial Information Science, Jan. 12, 2018, 11 pages, vol. 21, No. 1, Taylor & Francis Group.
Andreas Bircher et al., Structural Inspection Path Planning via Iterative Viewpoint Resampling with Application to Aerial Robotics, 2015 IEEE International Conference on Robotics and Automation (ICRA), May 1, 2015, 8 pages.
Examination Report issued in GB Application No. GB1815864.2, dated Jul. 21, 2020, pp. 3.
Search Report issued in GB Application No. GB1815864.2, dated Mar. 14, 2019, 5 Pages.
Search Report issued in GB Application No. GB1902475.1, dated Aug. 14, 2019, 5 Pages.
International Search Report and Written Opinion Issued in International Application No. PCT/GB2019/052500, dated Oct. 31, 2019, 11 pages.
International Search Report and Written Opinion Issued in International Application No. PCT/GB2019/052521, dated Jan. 3, 2020, 16 pages.

* cited by examiner

CONTROL AND NAVIGATION SYSTEMS, POSE OPTIMIZATION, MAPPING, AND LOCALIZATION TECHNIQUES

CROSS-REFERENCE TO RELATED APPLICATIONS

This application is the U.S. National Stage Application of International Application No. PCT/GB2019/052521, filed Sep. 10, 2019, which claims priority to United Kingdom Patent Application Serial No. 1902475.1, filed Feb. 22, 2019, Greek Patent Application Serial No. 20190100076, filed Feb. 13, 2019, United Kingdom Patent Application Serial No. 1815864.2, filed Sep. 28, 2018, and Greek Patent Application Serial No. 20180100410, filed Sep. 10, 2018, which are hereby incorporated by reference in their entirety.

TECHNICAL FIELD

Embodiments of the present invention relate to control and navigation systems for autonomous vehicles and, in particular embodiments, for unmanned autonomous vehicles. Embodiments also relate to pose optimization, mapping, and localization techniques.

BACKGROUND

With the decrease in the cost of sensor technology and computing power, among other things, there has been a great deal of recent development in relation to autonomous vehicles, including unmanned autonomous vehicles (which are colloquially referred to as "drones").

Such vehicles may be controlled by a human operator located remotely from the drone and that control may be partially automated. For example, in the case of an aerial vehicle, one or more of the flight controls may be autonomous such that the role of the operator is simplified. Nevertheless, there is a desire to provide fully autonomous drones which are capable of performing tasks substantially without operator intervention.

Effective substantially fully autonomous drones will reduce the requirement for a skilled operator (making the tasks those drones complete simpler and less expensive), reduce the risk of operator-error, and help to ensure repeatability along with a systematic approach to certain tasks.

Some tasks in which drones are already being used include the inspection of objects and structures. In particular, aerial drones have shown great potential in this regard—reducing the need for human inspections to take place (which can be extremely difficult in relation to some objects and structures).

Increasing the degree of automation of drones performing such tasks is difficult. In particular, the drone must be navigated within a real-world environment in which objects are not always in a known, and/or predetermined location and in which the drone (and other objects) are constantly exposed to changing environmental conditions.

There is a need, therefore, to provide local control and navigation systems for autonomous vehicles, and/or better control and navigation systems for autonomous vehicles.

Predicting Out-of-View Feature Points for Model-Based Camera Pose Estimation, by Oliver Moolan-Feroze, and Andrew Calway teaches a framework that uses deep learning to predict object feature points that are out-of-view in the input image. This system was developed with the application of model-based tracking in mind, particularly in the case of autonomous inspection robots, where only partial views of the object are available. Out-of-view prediction is enabled by applying scaling to the feature point labels during network training. This is combined with a recurrent neural network architecture designed to provide the final prediction layers with rich feature information from across the spatial extent of the input image.

BRIEF SUMMARY

Accordingly, aspects of the present invention are recited below and in the appended claims.

BRIEF DESCRIPTION OF THE DRAWINGS

Embodiments of the invention are described, by way of example only, with reference to the accompanying drawings, in which.

DETAILED DESCRIPTION

Embodiments of the present invention may include an autonomous vehicle 1. The autonomous vehicle 1 could take a number of different forms and many of the embodiments are described with reference to the autonomous vehicle 1 being an aerial vehicle (i.e., an aircraft). However, the autonomous vehicle 1 could be a land vehicle (configured for move across a ground surface), or a watercraft (configured to move through water), or an amphibious vehicle, for example.

The autonomous vehicle 1 may be a multirotor helicopter 1 and embodiments will be described, for convenience, in relation to a multirotor helicopter 1 (and, in particular, a quadcopter)—see FIG. 1, for example.

Figure 1:
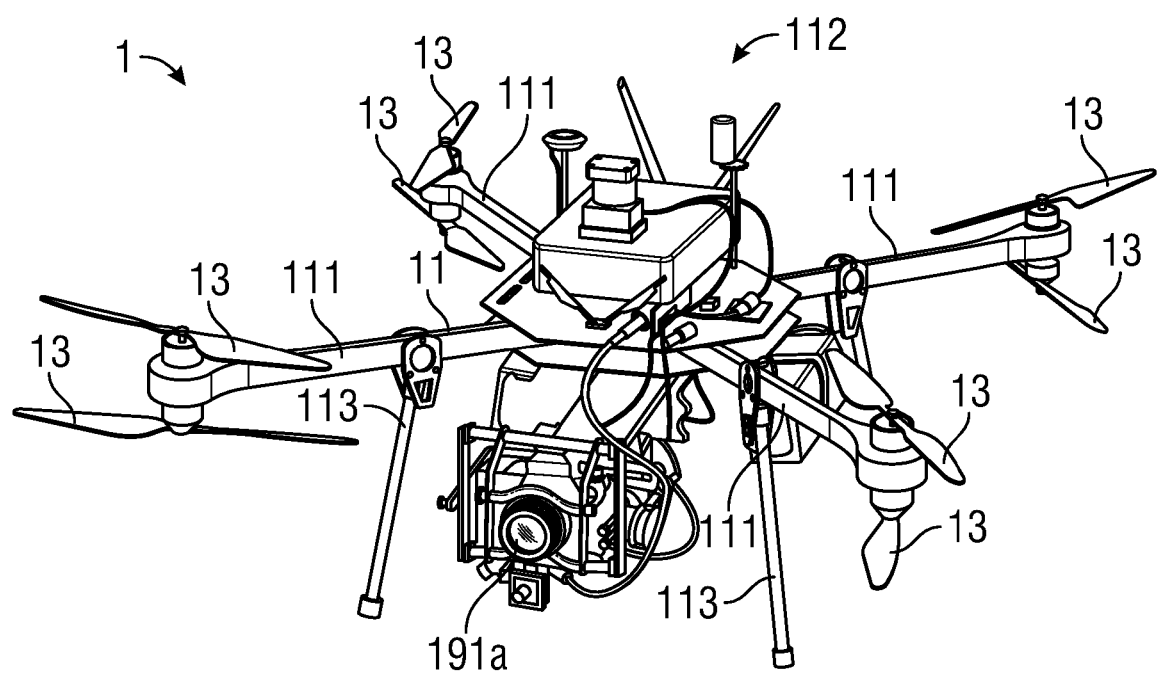
FIG. 1 shows an example autonomous vehicle of some embodiments.

The autonomous vehicle 1 may include a frame 11 (i.e., a chassis)—see FIG. 1, for example. The frame 11 may be configured to support a drive system 12 of the autonomous vehicle 1—see FIG. 2, for example. The drive system 12 is configured to drive movement of the autonomous vehicle 1. Accordingly, the drive system 12 may include one or more motors 121 and/or one or more engines 122. The one or more motors 121 may each be an electrical motor and the one or more engines 122 may each be an internal combustion engine. The drive system 12 may include one or more gearboxes or other mechanical transmission systems.

Figure 2:
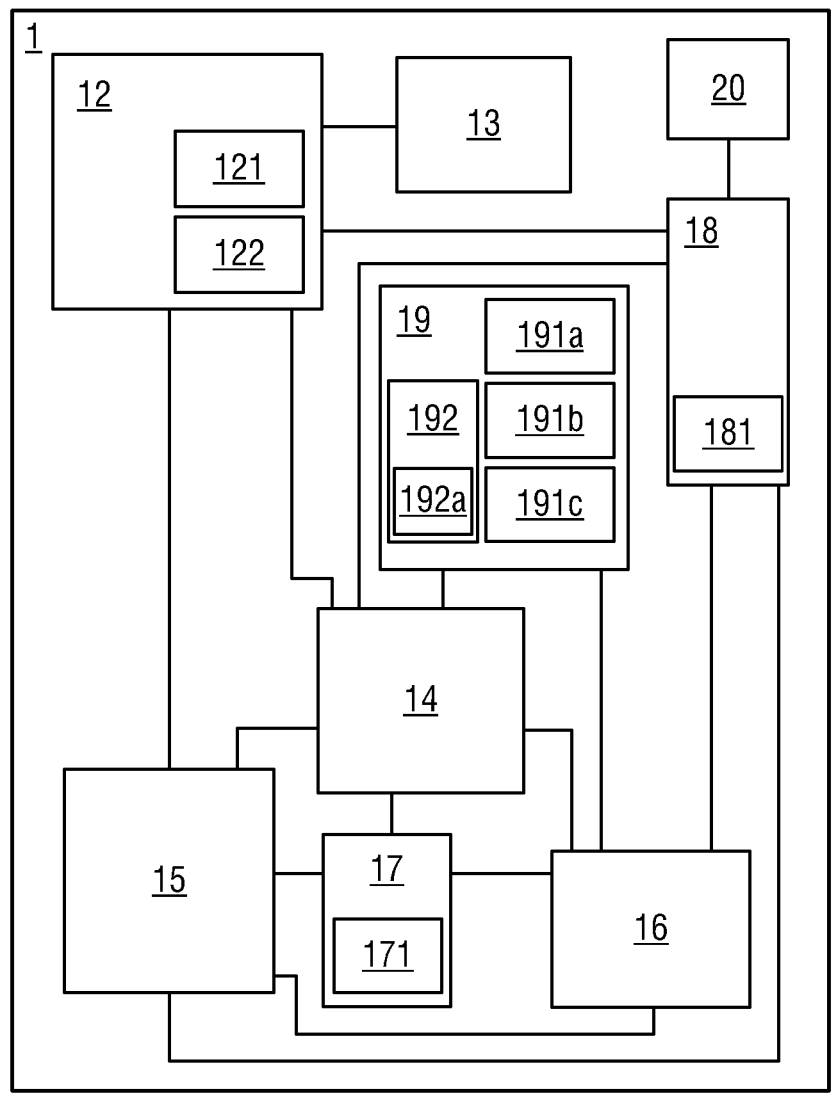
FIG. 2 shows a schematic view of an autonomous vehicle of some embodiments.

The drive system 12 may be configured to drive rotational movement, for example, of one or more drive elements 13—see FIGS. 1 and 2, for example—of the autonomous vehicle 1 with respect to the frame 11 about respective rotational axes (via a gearbox or other mechanical transmission system, or otherwise). The or each drive element 13, when so driven, is configured to drive movement of the autonomous vehicle 1—e.g., through the air, along the ground, through the water, etc.

The or each drive element 13 may include a respective propeller, rotor or wheel, for example. In the case of a rotorcraft, for example, the or each drive element 13 may include a rotor. The or each drive element 13 may be configured, on rotation, to cause movement of the autonomous vehicle 1 in at least one direction.

As will be appreciated, depending on the nature of the autonomous vehicle 1 relatively complex arrangements of drive elements 13 may be provided. This is especially true of rotorcraft—of which there are numerous different known configurations.

In some embodiments, the drive system 12 may include one or more other actuators which control or drive movement of the autonomous vehicle 1. For example, the drive system 12 may include one or more steering mechanisms which are configured to move one or more steerable elements (such as wheels or a rudder) of the autonomous vehicle 1. The drive system 12 may include one or flight control actuators which are configured to move one or more flight control surfaces of the autonomous vehicle 1 (similar control actuators and surfaces may be provided for other types of craft, such as watercraft and "flight" control actuators and surfaces should be construed accordingly). In general terms, these are other examples of drive elements 13 and the actuators may be electrically or hydraulically driven for example.

In the case of a quadcopter as the autonomous vehicle 1, for example, there may be four drive elements 13 which each comprise a rotor. However, as in the depicted example, a quadcopter may also use a coaxial drive element 13 configuration such that there is a total of eight drive elements 13 arranged in four co-axial pairs. This, as will be appreciated, is just one example configuration.

The precise configuration of the drive elements 13 with respect to the frame 11 will depend on the nature of the autonomous vehicle 1 and the intended movements of the autonomous vehicle 1. In some embodiments in which the autonomous vehicle 1 is a multirotor helicopter, the autonomous vehicle 1 includes a plurality of drive elements 13 which are arranged with rotational axes which are generally vertical in normal operation. In fixed wing aircraft and/or boats and/or land vehicles, the or each drive element 13 have a rotational axis which is substantially horizontal in normal use.

In some embodiments, the frame 11 includes a number of arms 111 and each arm 111 may carry one or more of the drive elements 13. The frame 11 may include a main structure 112 which may be located generally centrally within the autonomous vehicle 1 in some embodiments. The frame 11 may include one or more legs 113 which are configured to support the main structure 112 with respect to a ground surface. In some embodiments, the one or more legs 113 may not be provided and the one or more arms 111 with their drive elements 13 may provide this support (e.g., in autonomous vehicles 1 which are configured to move over the ground surface with a drive element 13 in the form of a wheel).

In some embodiments, the drive system 12 is mounted primarily on the central structure 112 and mechanical power may be transmitted to the or each drive element 13 using a mechanical transmission (as described herein).

The drive system 12 is coupled to a power source 14 of the autonomous vehicle 1. In the case of a drive system 12 including one or more motors 121 (i.e., electrical motors), the power source 14 may include a battery, for example, or another form of electrical power storage device. In the case in which the drive system 12 includes one or more engines 122 (e.g., internal combustion engines), then the power source 14 may include a tank of fuel (which may be a hydrocarbon fuel such as gasoline or natural gas or liquefied petroleum gas or the like). The power source 14 may, in some embodiments, include a power generator (such as a fuel cell or solar panel or the like) which is configured to generate electrical power rather than to store electrical power.

As will be appreciated, therefore, the flow of electrical power and/or fuel to the or each motor 121 and/or engine 122 may be controlled by the drive system 12. Accordingly, the drive system 12 can be controlled to alter one or more operational characteristics of the or each motor or engine 121,122—such as the speed at which the motor and/or engine 121,122 drives the associated drive element 13. Likewise, the drive system 12 may control the operation of one or more other actuators as described herein.

The power source 14 may be mounted on the frame 11 (e.g., the central structure 112 thereof).

The drive system 12 is communicatively coupled to a flight control system 15 of the autonomous vehicle 1. The flight control system 15 is configured to control the operation of the drive system 12 in order to control one or more aspects of the operation (e.g., movement) of the autonomous vehicle 1. Whilst this is labelled as a flight control system 15 it will be appreciated that this label is primarily assigned with aircraft in mind. For embodiments in which the autonomous vehicle 1 is not an aircraft, then a different label may be applied to the flight control system 15—for example, a "drive control system" (which should be construed as encompassing the flight control system 15).

The flight control system 15 may take the form of a suitably programmed flight control computer (again, this label may be changed to drive control computer in embodiments in which the autonomous vehicle 1 is not an aircraft).

The flight control system 15 may be mounted on the frame 11 (e.g., the central structure 112 thereof).

As mentioned above, the flight control system 15 is configured to control the operation of the drive system 12 and, with this in mind, the flight control system 15 is communicatively coupled to a navigation system 16 of the autonomous vehicle 1. The navigation system 16 is configured to provide instructions to the flight control system 15 for controlling movement of the autonomous vehicle 1 in accordance with a navigational plan (i.e., a flight plan defining a flight path) stored in and/or generated by the navigation system 16. In some embodiments, the flight control system 15 is configured to control the operation of the drive system 12 to control the orientation and/or position of the autonomous vehicle 1. In some embodiments, in which the autonomous vehicle 1 is capable of movement in one or more of an up-down degree of freedom, a left-right degree of freedom, a forward-backward degree of freedom, a pitch degree of freedom, a yaw degree of freedom, and a roll degree of freedom, the flight control system 15 is configured to control movement in that or those degree(s) of freedom of movement.

In other words, the flight control system 15 is primarily concerned with controlling the autonomous vehicle 1 to achieve movements which are specified by the navigation system 16. The navigation system 16 determines where the autonomous vehicle should travel and the flight control system 15 is configured to control the autonomous vehicle 1 to move in the desired manner based on the instruction from the navigation system 16.

The navigation system 16 may take the form of a suitably programmed navigation computer and this computer might be the same computer as the flight control computer—the computer running suitable programs such that the computer performs both roles.

In some embodiments, the navigation system 16 may be mounted on the frame 11 (e.g., the central structure 112 thereof). However, in some embodiments, the navigation system 16 may be remote from the autonomous vehicle 1—in other words, the navigation system 16 may be communicatively coupled to the flight control system 15 (i.e., to the autonomous vehicle 1) but may not travel with the autonomous vehicle 1. In some embodiments, the navigation system 16 is a distributed system such that some parts of the system are carried by the autonomous vehicle 1 and other parts are remotely located with respect to the autonomous vehicle 1.

The autonomous vehicle 1 includes a sensor system 17. The sensor system 17 is configured to sense one or more aspects of the environment of the autonomous vehicle 1 and to provide these one or more sensed aspects to the navigation system 16 and/or the flight control system 15 to allow those systems 15/16 to perform their respective functions.

The sensor system 17 may, therefore, include one more sensors 171 each of which is configured to sense a different aspect of the environment of the autonomous vehicle 1. These one or more sensors 171 may be referred to as a sensor suite of the autonomous vehicle 1. The one or more sensors 171 may include, for example, one or more: accelerometers, gyroscopic sensors, magnetometers, radio navigation systems (such as a satellite-based radio navigation system (e.g., using the Global Positioning Satellite system, GLONASS, Galileo, Beidou, IRNSS, or QZSS)), and/or the like.

The one or more sensors 171 generate sensor outputs which are passed to the flight control system 15 and/or the navigation system 16. These systems 15/16 use the sensor outputs in order to control one or more aspects of the operation of the autonomous vehicle 1 based at least in part on the sensor outputs.

The sensor system 17 may be mounted on the frame 11 (e.g., the central structure 112 thereof in some embodiments). In some embodiments, however, the one or more sensors 171 of the sensor system 17 may be otherwise located on or around the autonomous vehicle 1.

Figure 5:
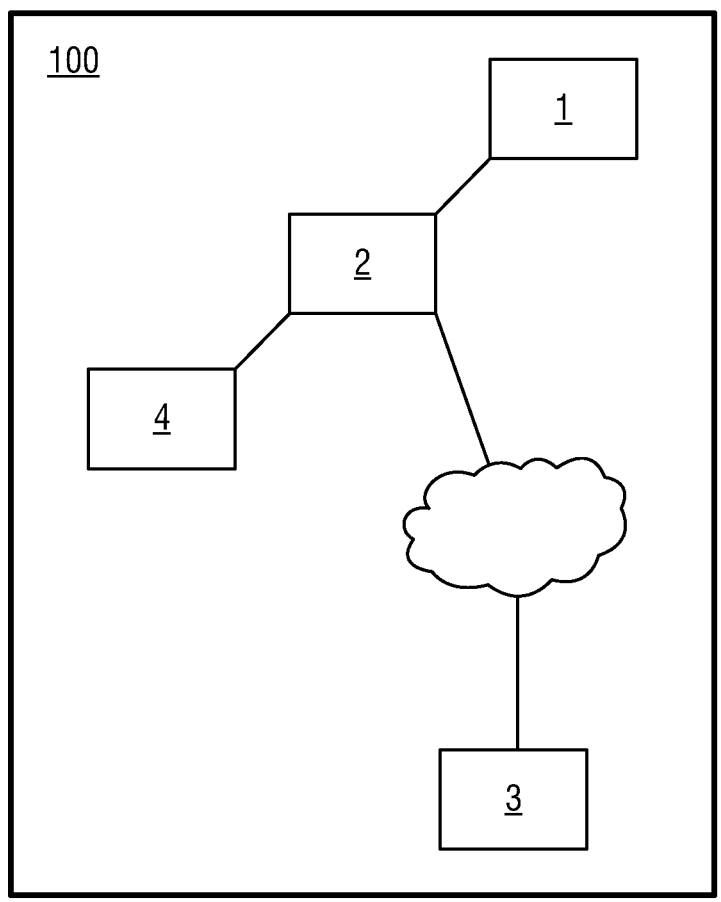
FIG. 5 shows an example system of some embodiments.

In some embodiments, at least one of the one or more sensors 171 is at least partially located remotely from the autonomous vehicle 1 (i.e., is not carried for movement with the autonomous vehicle 1). For example, the one or more sensors 171 may include a differential radio navigation system (such as a differential GPS system). In such embodiments, the one or more sensors 171 may include a radio navigation system sensor which is carried by the autonomous vehicle 1 and which is communicatively coupled (e.g., via a wireless communication channel—see the communication system 18) to a base station 2 (see FIGS. 3 and 5, for example) which is configured to generate a differential signal. The radio navigation system sensor may use the differential signal to correct a locally determined location generated by the radio navigation system sensor (wherein "locally" in this instance means determined by the radio navigation system sensor carried by the autonomous vehicle 1). In such examples, the sensor 171 may be viewed as a distributed sensor (such that the at least part of the base station 2 forms part of that sensor) or as a sensor 171 which receives a sensor output from another sensor to generate a modified or corrected sensor output. In some embodiments, the sensor may use real time kinematic positioning.

The sensor system 17 may include a ranging sensor as one of the one or more sensors 171. The ranging sensor is configured to determine a range (i.e., a distance) of another object from the ranging sensor (and so from the autonomous vehicle 1 to which the ranging sensor is mounted). The range may be output as sensor data, for example. The ranging sensor may include, for example, a light detection and ranging sensor (i.e., a LiDAR sensor). The ranging sensor may include, for example, a sound navigation and ranging sensor (i.e., a sonar sensor or other acoustic sensor, such as an ultrasound ranging sensor). The ranging sensor may include, for example, a radio detection and ranging sensor (i.e., a radar sensor). The ranging sensor may include, for example, a range imaging sensor (which may use, for example, stereoscopic images (e.g., of the visible light) to determine range). The ranging sensor may include a 1-D ranging sensor and/or a 2-D ranging sensor and/or a 3-D ranging sensor.

The autonomous vehicle 1 may include an inspection system 19 which is configured to inspect another object or volume (i.e., an object other than the autonomous vehicle 1). The inspection system 19 may be configured to output inspection data which is indicative of one or more characteristics of the other object. The inspection system 19, therefore, includes one or more inspection sensors 191. In some embodiments, the inspection system 19 includes a camera 191*a* (as an inspection sensor 191) which is configured to capture one or more images of the other object. The camera 191*a* may be configured to capture light in the visible light spectrum but additionally or alternatively may be configured to capture infrared and/or ultraviolent light images of the object. As will be appreciated, therefore, the camera 191*a* may comprise more than one camera sub-system—e.g., with each camera sub-system configured to capture an image in a different spectrum or from a different position relative to at least one other camera sub-system (e.g., to obtain a stereoscopic image).

In some embodiments, the camera 191*a* or camera sub-system may be configured to capture an image of a particular polarization of light (which may be particularly useful for inspecting some other objects 5 or volumes).

In some embodiments, the inspection system 19 includes one or more sensors 191 which are not a camera 191*a*. For example, the inspection system 19 may include an air quality sensor 191*b* which may be configured to detect one or more contaminants in the air (e.g., particulate matter). The inspection system 19 may include a radiation sensor 191c which may be configured to detect one or more contaminants in the air (e.g., particulate matter). The inspection system 19 may include an acoustic sensor as one of the one or more inspection sensors 191 which may be, for example, an ultrasound sensor. The one or more inspection sensors 19 may include a non-destructive testing sensor which may be an ultrasonic non-destructive testing sensor.

In some embodiments, the inspection system 19 may include a projector which is configured to emit (or project) a signal towards the object 5. The signal may be an acoustic or electromagnetic signal (e.g., light), for example. The inspection system 19 may include, in such embodiments, a receiver which is configured to receive at least part of the emitted signal—e.g., after reflection from the object 5. One or more characteristics of the object 5 may be determined by the inspection system 19 using the emitted signal and a received portion of the emitted signal (e.g., after reflection from the object 5). The projector may be configured to project structured light and the inspection system 19 may include a so-called structured light sensor system or structured-light 3D scanner.

The or each inspection sensor 191 may be mounted with respect to the frame 11 of the autonomous vehicle 1 using a respective mounting device 193. In some embodiments, there may be multiple inspection sensors 191 mounted with respect to the frame 11 by the same mounting device 193.

The mounting device 193 (or devices 193) used to secure the or each inspection sensor 191 may take a number of different forms. In some embodiments, the mounting device 193 is configured to provide a fixed positional arrangement with respect to the frame 11. As such, the mounting device 193 may include, for example, a substantially rigid bracket configured to be attached to the frame 11 (directly or indirectly) and to at least one of the one or more inspection sensors 191. The mounting device 193 may include an armature which is configured to move with respect to at least part of the frame 11 so that the position of the inspection sensor 191 is moveable with respect to the frame 11—this movement may be driven by an actuator under the control of an inspection system computer 192. In some embodiments, the mounting device 193 is configured to provide a substantially fixed orientation between the inspection sensor 191 and one or more other objects (such as the other object 5). In such embodiments, the mounting device 193 may include a gimbal mechanism which may have one to three degrees of freedom of movement. The provision of a mounting device 193 in the form of a gimbal mechanism may be used in relation to an inspection sensor 191 which includes the camera 191a—to assist with stabilizing the camera 191a in order to improve the quality of an image captured by the camera 191a.

The inspection system 19 may include the inspection system computer 192 (which may be the same computer as the navigation computer and/or the flight control computer—the computer running suitable programs such that the computer performs all of these roles). The inspection system computer 192 may be configured to control one or more aspects of the operation of the or each inspection sensor 191—for example, when an image is to be captured by the camera 191a or a sample taken by the air quality sensor 191b or radiation sensor 191c, and/or one or more parameters of the operation of the or each inspection sensor 191 (such as, in relation to the camera 191a, focus, shutter speed, aperture size, and the like).

In some embodiments, the inspection system computer 192 may be configured to receive the inspection data from the or each inspection sensor 191 and may store that inspection data for subsequent transmission or release. The inspection system computer 192 may be configured to determine when and how the inspection data is to be handled (e.g., transmitted or deleted). The inspection system computer 192 may, therefore, include a storage medium 192a which is configured to store the inspection data.

The inspection system 19 may be mounted on the frame 11 (e.g., the central structure 112 thereof).

In some embodiments, the autonomous vehicle 1 may include a visual guidance system 20 which is configured to capture one or more images for use by an operator to assist in operating and/or controlling the autonomous vehicle 1—see herein elsewhere. The visual guidance system 20 is configured, therefore, to capture an image (e.g., using a camera of the visual guidance system 20) and to generate guidance data which represents that image (e.g., such that at least part of the image can be reconstructed based on the guidance data).

The visual guidance system 20 may be mounted on the frame 11 (e.g., the central structure 112 thereof) or may be mounted on one of the arms 111 if provided.

The autonomous vehicle 1 may include a communication system 18. The communication system 18 may be communicatively coupled to one or more of the drive system 12, the power source 14, the flight control system 15, the navigation system 16, the sensor system 17, the inspection system 19, and the visual guidance system 20. In particular, the communication system 18 may be communicatively coupled to one or more of the flight control computer, the navigation computer, and the inspection system computer 192 (which may be the same computer, suitably programmed).

The communication system 18 is configured to transmit data from the autonomous vehicle 1 to a remote location (i.e., an element which is not carried by the autonomous vehicle 1). The communication system 18 is also configured to receive data from a remote location for use by the autonomous vehicle 1.

An example of data which may be received by the communication system 18 includes the differential signal—as described herein. Other data which may be received by the communication system 18 include one or more of: other sensor data (i.e. data from one or more sensors which are located remotely from the autonomous vehicle 1 (e.g. in the base station 2)), control information (such as flight control information for use by the flight control system 15 in the control of the operation of the drive system 12 (which may be direct flight control information such that the navigation system 16 is effectively circumvented), and navigation information (for use by the navigation system 16).

The communication system 18 may include one or more communication interfaces 181 and each communication interface 181 may be configured to transmit and/or receive data using a different communication channel and/or protocol.

One or more of the communication interfaces 181 may include a wireless communication interface (such as a radio frequency communication interface). The one or more communication interfaces 181 may include a wireless long range communication interface and a wireless short range communication interface. The wireless short range communication interface may be configured to send and/or receive data over a relatively short range and may be used for control and/or navigation information, for example (which may include the guidance data). The wireless long range communication interface may be configured to send and/or received data over a relatively longer range and may be used for less time critical data—such as a general telemetry information, or inspection data (as is described elsewhere).

In some embodiments, therefore, the one or more communication interfaces 181 may include a plurality of wireless communication interfaces. The one or more communication interfaces 181 may include one or more of a WiFi communication interface (or other communication interface operating at around 2.4 GHz, 3.6 GHz, 5 GHz, and/or 60 GHz), a communication interface operating at around 433 MHz, 915 MHz, and/or 2400 MHz, and/or a communication interface operating at around 315 MHz and/or 868 MHz, and/or a cellular communication network interface (which may use a broadband cellular telephone network communication system).

The communication system 18 may be mounted on the frame 11 (e.g., the central structure 112 thereof) or may be mounted on one of the arms 111 if provided.

The power source 14 may be configured to provide electrical power to one or more of the communication system 18, the drive system 12, the flight control system 15, the navigation system 16, the sensor system 17, the inspection system 19, and the visual guidance system 20.

Figure 3:
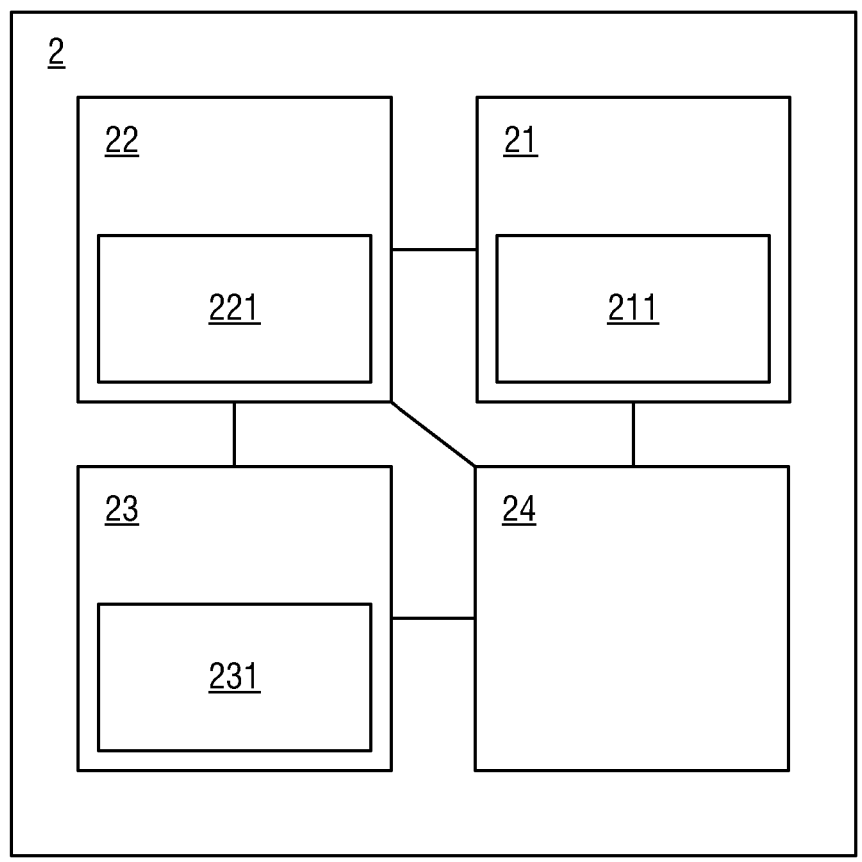
FIG. 3 shows a schematic view of a base station of some embodiments.

The base station 2—see FIG. 3, for example—may be configured to communicate with the autonomous vehicle 1 (and vice versa) via the communication system 18 of the autonomous vehicle 1. In some embodiments, the base station 2 is not provided. In some embodiments, the base station 2 is a unit which is configured to be placed generally within an operating area of the autonomous vehicle 1 (but which may be removed and transported to a different operating area for the autonomous vehicle 1 if required). In some instances, the base station 2 is a unit which has a substantially fixed geographical location and cannot readily be removed and transported to a new location. In some instances, the base station 2 is or includes a mobile computing device such as a mobile telephone, laptop, or tablet computer.

The base station 2 may include a base station communication system 21 which is configured to be communicatively coupled to the communication system 18 of the autonomous vehicle 1. The base station communication system 21 may include one or more communication interfaces 211 and each communication interface 211 may be configured to transmit and/or receive data using a different communication channel and/or protocol.

One or more of the communication interfaces 211 may include a wireless communication interface (such as a radio frequency communication interface). The one or more communication interfaces 211 may include a wireless long range communication interface and a wireless short range communication interface. The wireless short range communication interface may be configured to send and/or receive data over a relatively short range and may be used for communication with the autonomous vehicle 1 for example. The wireless long range communication interface may be configured to send and/or received data over a relatively longer range and may be used for connection to a remote server 3 and/or the Internet.

In some embodiments, therefore, the one or more communication interfaces 211 may include a plurality of wireless communication interfaces. The one or more communication interfaces 211 may include one or more of a WiFi communication interface (or other communication interface operating at around 2.4 GHz, 3.6 GHz, 5 GHz, and/or 60 GHz), a communication interface operating at around 433 MHz, 915 MHz, and/or 2400 MHz, and/or a communication interface operating at around 315 MHz and/or 868 MHz, and/or a cellular communication network interface (which may use a broadband cellular telephone network communication system).

The base station 2 may include a base station computer 22 which is programmed to perform one or more tasks as described herein. The base station computer 22 may be communicatively coupled to the base station communication system 21 to effect the communication of data to and from the base station 2 and, in particular, the base station computer 22.

The base station computer 22 may include a storage medium 221, the role of which is described herein.

The base station 2 may include a position sensor system 23 which includes at least one position sensor 231 which is configured to determine a geographical location of the base station 2. The at least one position sensor 231 may include a radio navigation system sensor (such as a satellite-based radio navigation system sensor (e.g., using the Global Positioning Satellite system, GLONASS, Galileo, Beidou, IRNSS, or QZSS).

The position sensor system 23 may be communicatively coupled to the base station computer 22 and/or to the base station communication system 21. The position sensor system 23 may, therefore, be configured to send base station position data to the base station computer 22 and/or to the base station communication system 21 for transmittal onwards to one or more other devices (such as the autonomous vehicle 1 and/or the remote server 3).

In some embodiments, the base station 2 (e.g., using the position sensor system 23) may be configured to determine a differential signal which is output as at least part of the base station position data (e.g., for use by the autonomous vehicle 1 as described herein).

The base station 2 may include a base station power source 24. In some embodiments, the base station power source 24 may be a source of electrical power and the base station power source 24 may be coupled to one or more of the base station communication system 21, the base station computer 22, and the position sensor system 23, to provide electrical power thereto.

In some embodiments, the base station power source 24 includes one or more of a battery, a connection to a mains electrical power supply, an electrical generator (which may include an internal combustion engine), and an alternator of a vehicle (such as a support vehicle used to transport the autonomous vehicle 1 to the operating area).

A combination of the autonomous vehicle 1 and the base station 2 may be referred to as an autonomous vehicle system 100 (see FIG. 5, for example), for example. As described elsewhere, however, the base station 2 need not be provided in some embodiments.

Figure 4:
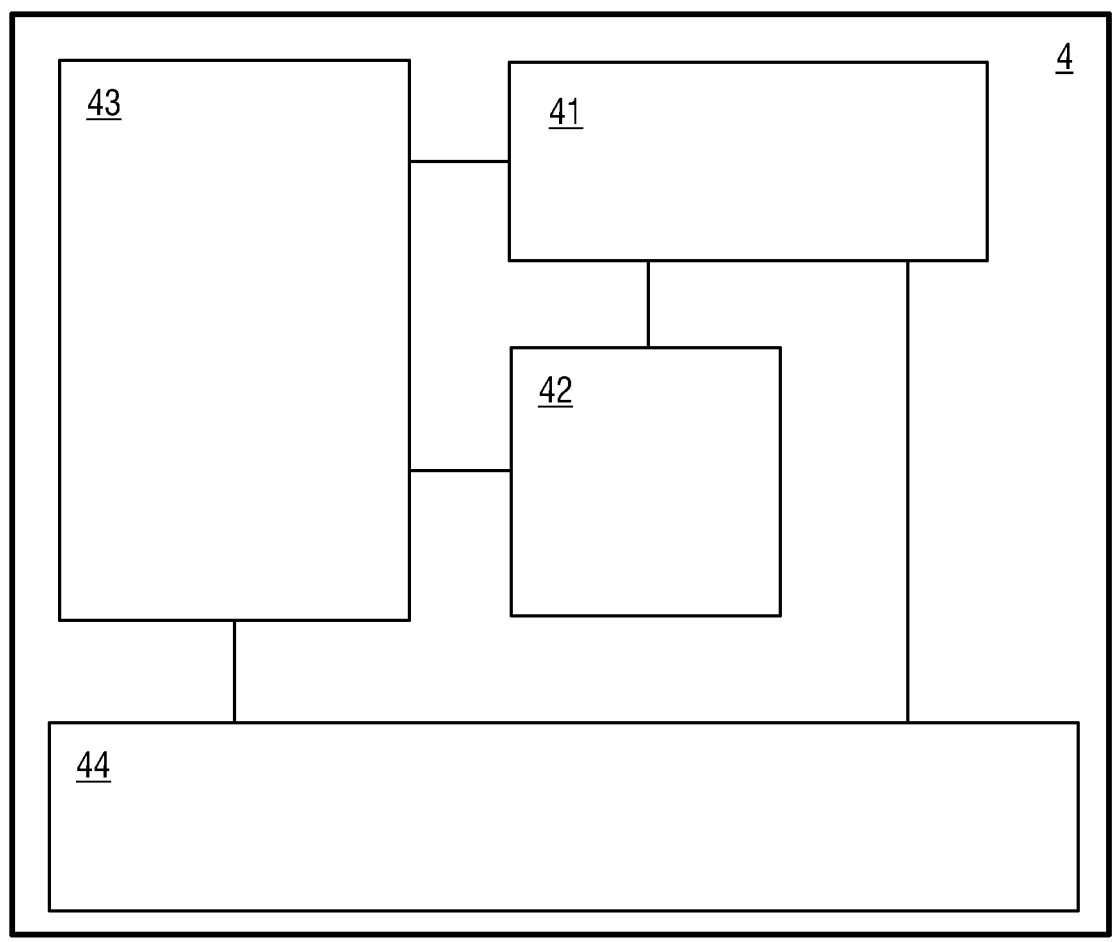
FIG. 4 shows a schematic view of an operator interface device of some embodiments.

In some embodiments, the autonomous vehicle system 100 may include an operator interface device 4 (see FIG. 4, for example). In such embodiments, the autonomous vehicle system 100 may not include the base station 2—such that the autonomous vehicle system 100 includes the autonomous vehicle system 100 and the operator interface device 4. In some embodiments, the autonomous vehicle system 100 includes the autonomous vehicle 1, the base station 2, and the operator interface device 4. In some embodiments the autonomous vehicle system 100 may include the remote server 3 too.

In some embodiments, the operator interface device 4 includes a computing device 41 which is programmed to provide an operator with an interface 42 using which the operator can control one or more aspects of the operation of the autonomous vehicle 1.

The computing device 41 may be a mobile computing device such as a mobile telephone, a tablet, or a laptop. As such the computing device 41 may include a power source 43 such as a battery.

The operator interface device 4 includes an interface device communication system 44 which is configured to communicate with the base station 2 (e.g., with the base station communication system 21) and/or the autonomous vehicle 1 (e.g., the communication system 18 thereof). Accordingly, the interface device communication system 44 may be a wired or wireless communication system which may be configured to use a communication interface corresponding with one of the communication interfaces 181,211 described herein. In some embodiments, the interface device communication system 44 includes a plurality of such communication interfaces and uses different such interfaces to communicate with the base station 2 and the autonomous vehicle 1.

In some embodiments, the base station 2 and the operator interface device 4 are one and the same device 2,4.

The autonomous vehicle 1 (and the autonomous vehicle system 100) may be configured to inspect another object or volume 5. That other object or volume 5 may be, for example, one or more of a wind turbine, photovoltaic cells, aircraft external structures (such as wings, undercarriage, engines, tail, and fuselage), a construction site, a high-rise building, a boat, a dam, a bridge, a power line, a pipeline, a sea wall, a harbor wall, flood defenses, a railway line, a harbor (for air quality), a city (for air quality), a building, a tank, a nuclear reactor or associated parts of a nuclear power facility, a pile, a cable (undersee or overhead), and the like.

As will be appreciated, the one or more inspection sensors 191 which are provided as part of the autonomous vehicle 1 may be selected in accordance with the nature of the inspection task to be undertaken by the autonomous vehicle 1.

Embodiments are described with specific reference to the inspection of a wind turbine as the other object 5 (i.e., the subject of the inspection task); however, it will be appreciated that this description applies equally to the inspection of other objections and volumes, such as those mentioned herein.

As will be apparent, the various components of the autonomous vehicle systems 100 described herein communicate with each other using their respective communication systems 18,21,44. These communications may be over any of the wired or wireless communications channels described in relation to these systems 18,21,44, for example.

In some embodiments, the base station 2, if provided, may act as a relay station between the operator interface device 4 and the autonomous vehicle 1 such that communications between the operator interface device 4 and the autonomous vehicle 1 are channeled through the base station 2—which may act as a signal repeater and/or may receive the communications via one communication channel and relay them through another (different) communications channel.

The use of the base station 2 as a relay for communications may reduce the required transmission power of the communication systems 18,44 of the autonomous vehicle 1 and the operator interface device 4.

In some embodiments, the base station 2 may act as a relay for communications to the remote server 3—such that data sent from the autonomous vehicle 1 and/or the operator interface device 4 for the remote server 3 is first sent to the base station 2 which then re-transmits the data to the remote server 3 (e.g., using a different communication interface, such as the long range communication interface).

The operation of the autonomous vehicle 1, the base station 2, and the operator interface device 4 (and the remote server 3) is controlled by the one or more computer programs which are executed by the flight control computer and/or the navigation computer and/or the inspection system computer and/or the base station computer 22 and/or the computing device 41 and/or the remote server 3. As will be appreciated, the operation of these computers may be combined and/or distributed as desired to achieve the required control. The present description presents one or more arrangements of the computer programs but this is not to be viewed as limiting on the disclosure as a whole.

The flight control computer is configured to execute a flight control program. The flight control program is configured to receive flight control instructions comprising desired movements of the autonomous vehicle 1 within a volume—i.e., the operating area. The flight control program may be configured to receive inputs from the sensor system 17 (e.g., from the one or more sensors 171) which provide the flight control program with sensor data which enables the flight control program to seek to control the autonomous vehicle 1 in accordance with the flight control instructions. The flight control program may not, for example, be configured to determine a desired movement of the autonomous vehicle 1 but, instead, receives the desired movements (in the form of the flight control instructions) and then seeks to achieve those desired movements. The flight control program may, therefore, be configured to control the operation of the drive system 12 to seek to achieve the desired movements and this may include controlling the movement of the or each drive element 13 or other actuator (which may be a form of drive element 13 as described). As will be appreciated, the flight control program may be substantially unique to a particular autonomous vehicle 1 or type of autonomous vehicle 1, as the configurations of such vehicles can vary greatly from one to another.

The computing device 41 of the operator interface device 4 may include an interface 42 through which the operator can generate flight control instructions for transmittal to the flight control program to control the operation of the autonomous vehicle 1 manually. These flight control instructions may be referred to as, for example, the direct flight control information—because they are instructions which have not been generated by the navigation program. This interface 42 may form part of an operator control program which is configured to be executed by the computing device 41 of the operator interface device 4.

Accordingly, the operator interface device 4 may be used for manual control of the autonomous vehicle 1 if the need arises.

The navigation computer is configured to execute a navigation program which is configured to provide the one or more flight control instructions to the flight control program. The navigation computer may also receive inputs from the sensor system 17 (e.g., from the or each sensor 171) and may also receive inputs from the inspection system 19 and/or the visual guidance system 20.

It is the navigation program which determines a flight plan (i.e., a desired flight path) for the autonomous vehicle 1 in normal use, issues the flight control instructions with a view to achieving that flight path, and which monitors adherence to that flight path (and takes corrective action as required).

The navigation program may be communicatively coupled to an initial setup program which is used to provide the navigation program with initial information (e.g., initial setup parameters) in order to establish the flight plan.

The initial setup program may be configured, therefore, to receive one or more initial setup parameters for the navigation program. The initial setup program may be configured to be executed by the operator interface device 4 and, in particular, by the computing device 41 thereof. The operator may, therefore, be able to enter one or more of the initial setup parameters using the interface 42 of the operator interface device 4. In some embodiments, one or more of these initial setup parameters may be obtained from the remote server 3—having been previously entered and then stored in the remote server 3 for future use. In some embodiments, the initial setup program may be executed by the base station computer 22 and an interface may be served to the operator interface device 4 by the base station computer 2—to enable inputs from the operator to be received via the operator interface device 4.

More specifically, the initial setup program may receive one or more initial setup parameters which may include one or more of:

- the type of object 5 to be inspected;
- an approximate location of the object 5 (e.g., within 100 m of the actual location or within 50 m of the actual location, and/or with a location error of at least 1 m, or 5 m, or 10 m, or 20 m, or 30 m);
- a precise location of the object 5 (e.g., with a location error of less than 5 m, or 1 m, and in any event with a location error less than the location error of an approximate location of the object 5);
- a model of the object 5;
- one or more physical characteristics of the object 5;
- an approximate direction of the object 5 from the autonomous vehicle 1; and
- a position of one or more parts of the object 5.

In the example of the object 5 being a wind turbine, the type of object 5 may be an indication that the object is a wind turbine. Such information may be required if the initial setup program and/or navigation program are configured for use in inspecting multiple different types of object (or a volume which will be considered another form of object). However, in some embodiments, the initial setup program and/or the navigation program are configured for use in inspecting only wind turbines. Therefore, this information may already be provided within the initial setup program and/or the navigation program.

An approximate location of the object 5 may include an approximate longitude and latitude of the object 5—in other words an approximate geographic location. This information may be useful in determining an initial flight path of the autonomous vehicle 1 and/or for recording the inspection data against the location for future reference.

Similarly, the precise location of the object 5 may be a more precise geographical location of the object 5. This information may not be available for all objects 5 and it may be that the approximate geographical location can be provided but the precise location cannot. Again, this information may be used in much the same manner as the approximate location information above.

A model of the object 5 may, in the case of a wind turbine, be the model (e.g., type as opposed to a representation) of the wind turbine and may include a manufacturer. Whilst there will be some variation between specific instances of a particular model of an object, such as a wind turbine, all models will likely share certain characteristics. Therefore, this information may be used in order to lookup—e.g., using a database of the initial setup program or the navigation program or obtained from the remote server 3—one or more characteristics of the object 5. Such characteristics may include, in the case of a wind turbine as an example, a height of the tower, a size of the nacelle, a size of the hub, a size of the blades, a number of blades, and the like. Again, this information is useful for determining the initial flight path and for recording against a record for the inspection.

One or more physical characteristics of the object 5 may include the same types of information which may be obtained by using the model of the object 5 and so may be manually entered if known, for example.

An approximate direction of the object 5 from the autonomous vehicle 1 may be, for example, that the object 5 is to the north/south/east/west of the autonomous vehicle 1. As will be apparent from the present description, as part of the initial flight path the autonomous vehicle 1 moves to confirm the location of the object 5. An approximate direction of the object 5 from the autonomous vehicle 5 at the start of the flight of the autonomous vehicle 1 will help to ensure that the autonomous vehicle finds the object 5 relatively quickly and successfully (and/or that the correct object 5 is found—which may be a particular issue in relation to operation of the autonomous vehicle 1 in close proximity to many similar objects 5 (such as on a wind farm)).

A position of one or more parts of the object 5 may be, for example, the position of one or more blades of a wind turbine with respect to the tower of the wind turbine. Again, this may assist in the planning of the initial flight path.

In some embodiments, the initial setup program is configured to present to an operator a map or aerial photograph, via the operator interface device 4 (e.g., the interface 42). The initial setup program may be able to receive a user input (via the interface 42) of the current location of the autonomous vehicle 1 with respect to the object 5 (which may be shown in the map or aerial photograph). The initial setup program may be configured to use this information to determine, for example, the approximate location of the autonomous vehicle 1 and/or the approximate direction of the object 5 from the autonomous vehicle 1.

The initial setup program may otherwise or additionally present the operator—via the operator interface device 4 (e.g., the interface 42)—with a form with one or more associated data entry fields through which any or all of the above information may be entered.

In some embodiments, there may be a specific start location for the autonomous vehicle 1 with respect to the object 5—such as a launch pad or other marker. The operator may, therefore, locate the autonomous vehicle 1 at the specific start location and then use the operator interface device 4 to provide an indication to the initial setup program that the autonomous vehicle 1 is at the specific start location for inspecting that object 5.

In some embodiments, the operator may orient the autonomous vehicle 1 such that the orientation of the autonomous vehicle 1 with respect to the object 5 is predetermined—thus, providing the approximate direction of the object 5 with respect to the autonomous vehicle 1. The autonomous vehicle 1 may be provided with a visual indicator in this respect for the operator to align with the object 5.

In some embodiments, the operator may be required to position the autonomous vehicle 1 at a predetermined orientation with respect to the object 5. In the case of a wind turbine, for example, this may be oriented such that the autonomous vehicle is in front of the hub and blades (with respect to the tower). This may assist in providing the initial setup program and/or navigation program with information about the position of parts of the object 5 with respect to the autonomous vehicle 1.

With some or all of this initial data provided to the initial setup program, the initial setup program may pass this data to the navigation program. In some instances, the navigation program is executed substantially entirely by the navigation computer (which may be mounted on the frame 11 of the autonomous vehicle 1); however, in some embodiments at least part of that navigation program is executed by the operator interface device 4 and/or the base station computer 22.

The navigation program may also receive one or more inputs from the sensor system 17 of the autonomous vehicle 1—e.g., sensor data from the one or more sensors 171. This sensor data may include, for example, location information determined by the one or more sensors 171 for the geographical location of the autonomous vehicle 1 and/or its orientation (e.g., with respect to the earth's magnetic field using a sensor 171 in the form of a magnetometer).

The navigation program uses some or all of the data provided by the initial setup program (and/or predetermined information as a result of defined requirements for the operator to locate the autonomous vehicle 1 with respect to the object 5, as discussed above) to determine an approximate location of the object 5 from the autonomous vehicle 1 and to plan an initial flight path.

The navigation program may be configured to generate a visual representation of the approximate location and configuration of the object 5 and the autonomous vehicle 1 along with a visual representation of the initial flight path with respect thereto. This may be output to the operator interface device 4 for the operator to view and confirm.

The initial flight path may be defined within a frame of reference of the navigation system which may be aligned with a global frame of reference using, for example, geographical location information from the one or more sensors 171 (which may be refined using the base station location data, for example).

The initial flight plan is a flight plan which moves the autonomous vehicle 1 to one or more inspection locations at which the inspection system 19 of the autonomous vehicle 1 may be used to perform an inspection of the object 5. This may include, for example, capturing an image of at least part of the object 5 using the camera 191a and/or using one or more of the other inspection sensors 191 if provided.

The inspection locations are, therefore, locations which the autonomous vehicle 1 must reach. Moving between these locations, however, exposes the autonomous vehicle to many potential hazards, for example. A primary hazard is the risk of impacting the object 5. Therefore, there is need to define a safe flight path between the inspection location(s) and/or start and end locations (at which the autonomous vehicle 1 starts and ends its flight).

This may be achieved in some embodiments through the navigation program defining one or more transition locations. The transition locations are locations through which the autonomous vehicle 1 must pass.

The navigation program may also be configured to define a sequence of inspection location(s) and transition location(s) to provide the flight path and plan.

The flight plan may, therefore, comprise a sequence of locations (or "points") which include the one or more inspection locations (or "points") and one or more transition locations (or "points"). The sequence also includes a start location (or "point") and an end location (or "point"). The start and end locations may be one and the same and this may be referred to as a home location—which may be a home location which is specific to that flight in some embodiments, for example.

In some embodiments, a transition location is a location in a plane or on a locus which is defined as a safe plane or locus.

There may be an orientation of the autonomous vehicle 1 and/or the inspection system 19 with respect to the object 5 associated with each inspection location and/or transition location within the flight plan—to ensure that the inspection system 19 is correctly positioned to inspect the object 5.

The autonomous vehicle 1 may, under the instruction from the navigation program, commence a start-up routine which includes one or more of testing the sensor system 17, testing the communication system 18, testing the inspection system 19, and testing the drive system 12. In some embodiments, the navigation program is configured to estimate, for example, the power requirements in order to complete the initial flight path. This may be compared to a power availability of the power source 14 (e.g., a battery charge level) in order to determine whether the flight can be completed with the available power.

The autonomous vehicle 1 may, if the start-up routine completes successful, enter a ready state. The ready state may be indicated to the operator via the operator interface device 4. If the start-up routine fails to complete successful—e.g., because one or more of the tests fails—then the autonomous vehicle 1 may remain in an unready state and this may also be indicated to the operator via the operator interface device 4 (e.g., along with an indication of test which failed).

With the autonomous vehicle 1 in the ready state the operator may trigger operation of the autonomous vehicle 1 in accordance with the initial flight plan via the operator interface device 4—e.g., through the interface 42.

In the example case of an aircraft as the autonomous vehicle 1, commencement of the operation of the operation of the vehicle 1 may include a spin-up cycle (in which the or each drive element 13 is driven up to a required speed by the drive system 12) followed by a take-off sequence (in which the autonomous vehicle 1 takes off).

During movement (i.e., flight in the example) of the autonomous vehicle 1, the navigation program (e.g., operating on the navigation computer of the navigation system 16) provides flight control instructions to the flight control program (which is operating on the flight control computer of the flight control system 15).

As will be appreciated, the navigation program has defined a flight path which is based on a model (i.e., a simplified representation) of the object 5 and the start location of the autonomous vehicle 1 with respect to the object 5 and the transition and inspection location(s).

However, the start location of the autonomous vehicle 1 with respect to the object 5 may well be an approximation and, even if relatively accurate, may still be insufficiently accurate for an inspection to occur.

Therefore, the navigation program is configured to re-assess the location of the object 5 with respect to the autonomous vehicle 1 during the flight of the autonomous vehicle 1—i.e., as the vehicle 1 performs its inspection. In other words, the location of the object 5 with respect to the autonomous vehicle 1 is refined during operation of the autonomous vehicle 1.

The re-assessment and refinement of the location of the object 5 with respect to the autonomous vehicle 1 may be such that the flight path must be altered. As will be understood, a basic alteration would be to shift the flight path in space as the relative locations are refined. However, this alone may be insufficient to ensure the safe operation of the autonomous vehicle 1 and that the inspection task is successfully completed.

For example, the refinement of the location of the object 5 with respect to the autonomous vehicle 1 may include the location of part of that object 5 with respect to the autonomous vehicle 1 and that part may be moveable with respect to another part. In the case of a wind turbine, the rotational position of the blades of the turbine with respect to the tower (about an axis of the tower) and/or with respect to the nacelle (about an axis of the nacelle) may be refined such that the actual location is determined to be different compared to the initial information (e.g., initial setup parameters) provided by the initial setup program, for example.

Refinements of this type may mean that the flight path, if followed, would now cause the autonomous vehicle 1 to impact a part of the object 5 and/or may mean that the inspection system 19 does not inspect the correct part of the object (e.g., the camera 191a may take a picture of thin air rather than a wind turbine blade).

Accordingly, the navigation program is configured to redefine the flight plan (to form a re-defined flight plan) during operation of the autonomous vehicle 1—as new information about the relative position of the object 5 and autonomous vehicle 1 is determined.

In addition to redefining of the flight plan due to the approximate initial relative location information provided, such flight plans typically assume ideal operating conditions—in which the autonomous vehicle 1 can and does follow the flight path set out in the plan. However, in practice, the autonomous vehicle 1 is exposed to external forces which are unpredictable and for which compensation is difficult to provide. In the case of an aircraft, this may include the effect of the wind on the autonomous vehicle 1 (but similar issues arise with watercraft due to currents and with ground vehicles due to unstable or slippery surfaces, for example).

If, when exposed to such forces and moved from the desired flight path, the autonomous vehicle 1 attempts to return to the originally desired flight path then this may no longer be an ideal flight path and there may be a better flight path as a result of the unintended movement. Again, identifying new ideal flight path requires the navigation program to redefine the flight plan during operation of the autonomous vehicle 1.

As will be appreciated, redefining the flight plan during operation of the autonomous vehicle 1 is a complex task, which must be performed quickly and accurately to enable safe and efficient operation of the autonomous vehicle 1.

There is a need, therefore, to provide better flight planning techniques.

The flight planning implemented by embodiments is based on a model of the object 5 and this model may be refined throughout the operation of the vehicle 1.

Figure 12:
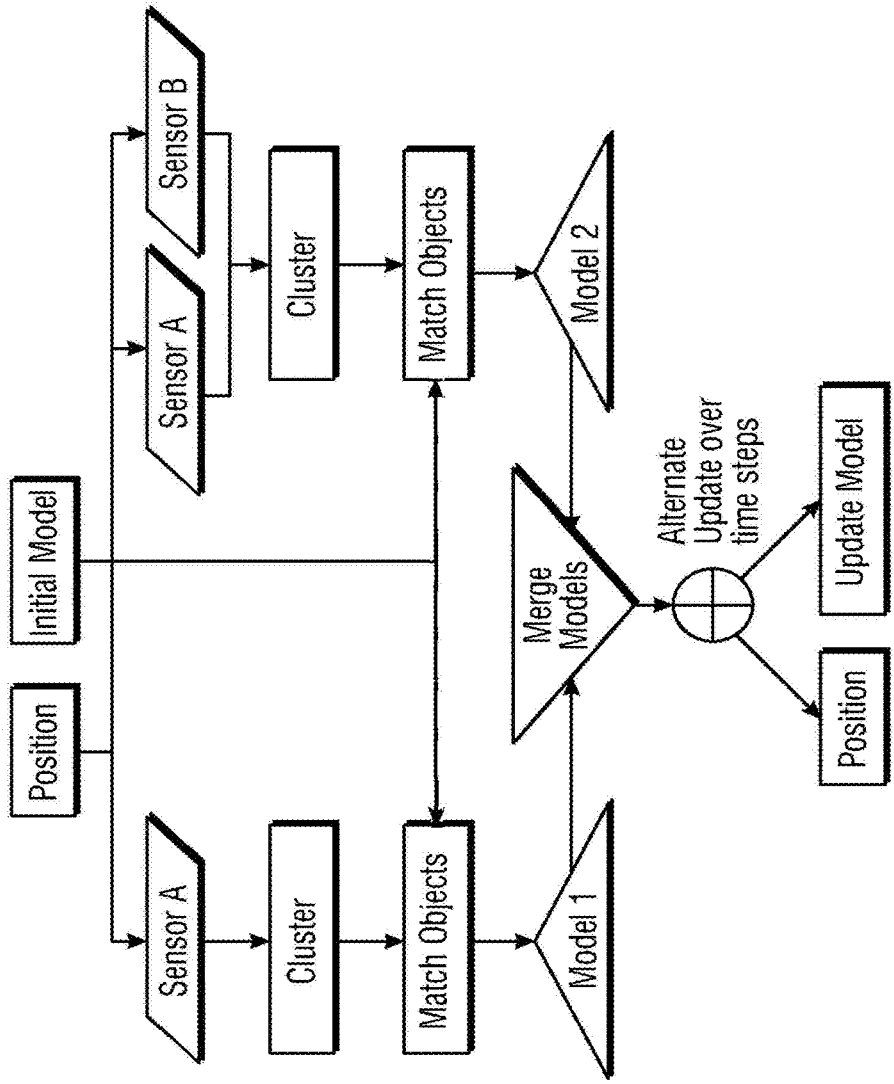
FIG. 12 shows a flow diagram of a process of generating and combining in-flight models according to some embodiments.

An overview of the model refinement which may be implemented by embodiments can be seen in FIG. 12. This overview is one example and it should be noted (as explained herein that more or few sensors may be used and more or fewer models may be generated). The refined model may then be used in flight planning and each refinement of the model may result in re-processing of the flight plan and revisions thereto during the flight (i.e., during operation of the vehicle 1). This process may be substantially continuous during operation of the vehicle 1 (e.g., during flight).

Looking at FIG. 12, an initial model (e.g., simplified representation of the object 5) may be determined and this may be performed by the navigation program. This model may be determined based on the initial setup parameters, for example. However, the model could be determined through other methods.

This model is of the object 5 or at least part thereof and may include one or more other objects (or parts thereof)—i.e., other than the object 5 to be inspected. This initial model along with a position for the object 5 relative to the autonomous vehicle 1 (e.g., the inspection system 19) form the preliminary inputs on which the navigation is based. As will be appreciated, the position may be in the form of location information which may form part of the initial model itself.

The navigation program is configured to receive data from the sensor system 17, e.g., from the one or more sensors 171. As shown in FIG. 12 as an example, the data from one sensor 171 may be used independently (such as the data from "Sensor A" in on the left of the figure) or the data from more than one sensor may be combined (such as the data from "Sensor A" and "Sensor B" on the right of the figure).

The data is analyzed by the navigation program to cluster that data into objects and/or partial objects represented by the data received from the sensor system 17.

As will be appreciated, this may include the combining of data from multiple sensors 171 prior to clustering (see, for example, the right side of FIG. 12).

The navigation program may then use the identified objects or partial objects from the data retrieved from the sensor system 17 along with the initial model to match the object or partial objects in the data from the sensor system 17 with the initial model or parts thereof. This may include use of location information from the initial model as well as location information generated from the sensor data.

This enables the cross-identification of parts of the initial model with the data retrieved from the sensor system 17.

As will be appreciated, the sensor data retrieved from one sensor 171 or set of sensors 171 combined may be more or less accurate than the sensor data from another sensor 171 or set of sensors 171 for various potential reasons.

Therefore, the navigation program may generate one or more potential revised models, based on the sensor data (which may include location information), the initial model (which may include location information), and the cross-identification results.

The navigation program may be configured to combine two or more potential revised models to derive a merged model which is then used to update the initial model (including new location information).

This process may be repeated such that the updated initial model is then itself updated (e.g., becomes the initial model which is indicated at the top of FIG. 12). This may be an iterative progress.

Along with updating of the model, the navigation program may also be configured to determine and update a flight plan, including a flight path. Each time the model is updated, the flight plan must also be checked and updated if required—in light of the new model. Again, this may be an iterative process.

This general process performed by the navigation program is discussed in more detail below. At least an initial flight plan may be determined using the initial model. Therefore, the discussion below begins with a discussion of the model followed by how the flight plan may be determined. There is then a discussion about how the model may be updated (see the mapping and localization processes).

As mentioned above, the navigation program uses an initial model of the object 5 or parts thereof.

The model may comprise a collection of geometric shapes or objects which provide a simplified representation of the object 5.

In the example of a wind turbine as the other object 5 (and also in relation to other objects 5), the model may comprise one or more cylinders. For example, the tower of the wind turbine may be represented by one cylinder, the nacelle may be represented by another, and each of three blades may each be represented by a respective cylinder.

In some embodiments, the or each geometric shape may be a convex solid that may be sampled by a set of convex polygons stacked parallel along one of its dimensions. In some embodiments, the stack may not be a parallel stack such that adjacent sides of two polygons are angled with respect to each other—which may be particularly useful in relation to modelling of curved objects 5 or parts thereof, for example. Each convex polygon may form a slab with a thickness and the thickness of each slab may (or may not) be the same as each other. In some embodiments, the subtended angle between any three adjacent points (i.e., corners) of the or each polygon may be <180 degs.

The model may, therefore, include one or more convex shapes which may encompass the object 5. The model may, however, use one or more other shapes to encompass the object 5 (in addition to or instead of convex shapes).

Indeed, in some embodiments, the model could include a point cloud, with the points representing surface locations on the object 5. However, in some embodiments, the model is formed of only convex shapes. In some embodiments, the or each convex shape is a three dimensional convex shape. In some embodiments, the model may include one or more meshes of two dimensional shapes—such as a triangular or square or rectangular mesh of shapes forming the model.

The model may be formed by one or more shapes which are such that an inspection target may be defined on an edge of the or each shape and an inspection location identified by a projection therefrom onto the inspection target—a convex shape being one example thereof.

Figure 15:
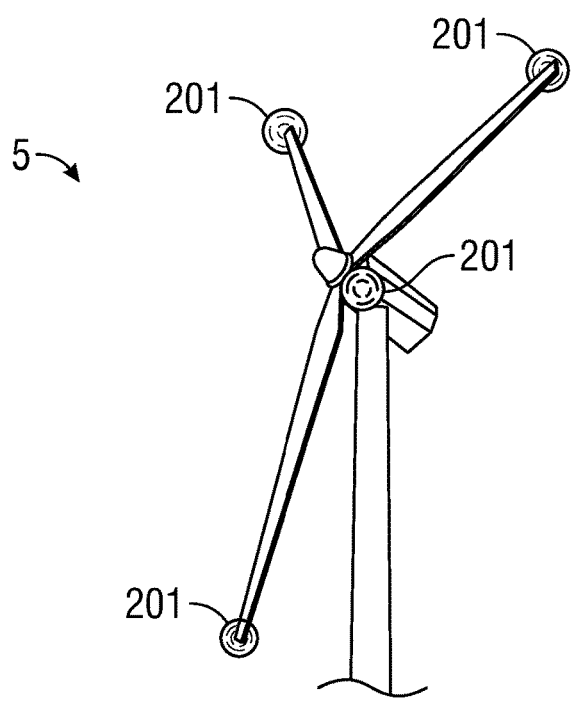
FIG. 15 shows a model including feature points overlaid on an image of a wind turbine.

In some embodiments, the model may comprise a plurality of feature points 201, $\mathcal{P}^{cc}$, which each represent the locations of one or more features of the object 5 (see FIG. 15, for example). The or each feature represented by a feature point 201 may be a feature which can be identified in one or more images of the object 5, which may include one or more visible light images, for example.

In the case of a wind turbine, for example, as the object 5, the feature points 201 may represent, for example, one or more of a base of a tower of the wind turbine, a top of the tower of the wind turbine, a distal tip of the blade (or blades) of the wind turbine, and a proximal end of the blade (or blades). The proximal end of the blade or blades may be a central location with respect to the blade or blades about which the blade or blades rotate (e.g., the hub for the blade or blades).

Figure 14:
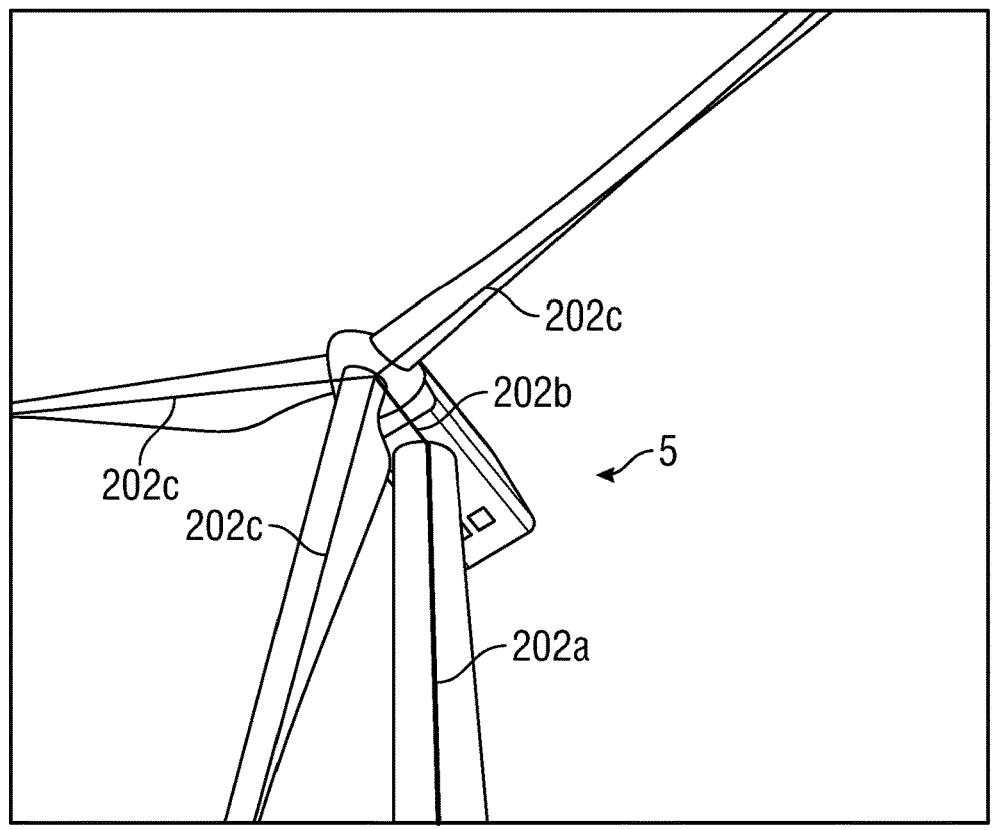
FIG. 14 shows a model including feature lines overlaid on an image of a wind turbine.

In some embodiments, see FIG. 14 for example, in addition to or instead of the feature points 201, the model may comprise a set of feature lines 202, $\mathcal{L}^{cc}$, which extend between feature points 201 (each feature line 202 of the set extending between two feature points 201). The feature points 201 may, therefore, provide endpoints for the feature lines 202 forming the model. The feature lines 202 may collectively form a representation of the object 5 or a part thereof. This representation may, for the purposes of explanation, form a stick-like or skeletal drawing of the object 5 or a part thereof.

In the case of a wind turbine, the model—comprising one or more feature lines 202—may include:
 a first feature line 202a extending between a feature point 201 representing the base of the tower of the wind turbine and a feature point 201 representing the top of the tower of the wind turbine;
 a second feature line 202b extending between the feature point 201 representing top of the tower and a feature point 201 representing the hub; and
 a plurality of third feature lines 202c each extending from the feature point 201 representing the hub to respective feature points 201 representing distal blade tips.

A model of an object 5 in the form of a wind turbine may, therefore, include six feature points 201 and five feature lines 202.

As will be understood, the feature points 201 may be defined using a three dimensional coordinate system and, likewise, the feature lines 202 may be defined in a three dimensional coordinate system. The feature lines 202 may be defined in a number of different ways—such as extending in a straight line between two feature points 201 or extending from a feature point 201 in a specified direction for a specified distance.

The model, with its feature points 201 and/or feature lines 202, may therefore provide a representation of one or more physical characteristics of the object 5 and this may include a pose of the object 5—such as the relative position of the blades of a wind turbine with respect to the tower of the wind turbine—and/or a position of the object 5 within a frame of reference. This model may be sufficiently generalized to accommodate various different versions of the object 5—for example, different designs/configurations/shapes and sizes of wind turbine.

The feature lines 202 may represent central parts of the object 5. In particular, the feature lines 202 may include one or more lines which do not represent edges of the object 5 but, rather, would lie inside the object 5 if the object 5 were projected onto the model. In some instances, this form of model may be advantageous if edges cannot readily be detected (see elsewhere herein about how the models may be parameterized) and/or the model is expected to represent a number of variations of the object 5 (e.g., different designs/configurations/shapes and sizes of wind turbine).

A model comprising one or more feature points 201 and/or feature lines 202 of this type may be referred to as a skeletal model, for example. The skeletal model, therefore, be distinguished from a model comprising a collection of geometric shapes or objects; however, both forms of model provide a simplified representation of the object 5. In some embodiments, the model is an articulated model, such that changes in one or more parameters of the model may result in non-linear and/or discontinuous movement of the at least part of the model. The skeletal model may include at least one parameter which may define a configuration of at least part of the object 5.

The navigation program may be configured to determine the model or may be provided with the model (e.g., from the remote server 3). The model represents or describes the object 5.

The model is a representation of the object 5 (or a part thereof) and may have a nominal form dependent on the type of object 5 (e.g., a wind turbine may be represented in the model by shapes for the tower, nacelle, and each blade).

The model may be provided to the navigation program as an unparameterized nominal model—i.e., a relatively generic representation of the object 5. The model may, therefore, include one or more configurable parameters.

These one or more configurable parameters may place the nominal model relative to the autonomous vehicle 1 (e.g., to the inspection system 19) and/or the position from which the autonomous vehicle 1 will be launched. The one or more configurable parameters may include a height associated with at least part of the object 5—such as a height of the nacelle of a wind turbine—relative to the autonomous vehicle 1 (e.g., to the inspection system 19) and/or the position from which the autonomous vehicle 1 will be launched. The one or more configurable parameters may include at least one relative position of a part of the object 5 with respect to another part—such as the location of a blade of the wind turbine (this may be a position relative to the tower for example). The at least one relative position may include the heading of the wind turbine and this may be relative to, for example, North. The at least one relative position may include the position of the nacelle or blade center relative to the tower—alternatively, this may be a separate parameter relative to the autonomous vehicle 1 (e.g., to the inspection system 19) and/or the position from which the autonomous vehicle 1 will be launched. The one or more configurable parameters may, therefore, include the positions of one or more feature points 201 and/or one or more feature lines 202 (their endpoints and/or lengths and/or directions of extension)—noting the discussion herein regarding how the feature lines 202 may each be defined.

The model may be parameterized (i.e., completed by the determining the parameters associated with the model—in other words, determining the values of the parameters) by the initial setup program in the first instance, in some embodiments. Alternatively, the initial setup program may provide information regarding the object 5 which is then used by the navigation program to parameterize the model.

The parameterization of the model may, therefore, include the defining of one or more of the feature points 201 and/or feature lines 202 using the information obtained through the initial setup program. In some embodiments, the parameterization of the model may include the processing of one or more images of the object 5. The or each image may include one or more visible light images, for example.

The or each image may be captured by a sensor 171 of the sensor system 17 (which sensor 271 may include a camera). In some embodiments, the or each image may be captured by an inspection sensor 191 of the inspection system 19 (which inspection sensor 191 may include a camera 191a). Indeed, in some embodiments, a camera 191a may be shared between the sensor system 17 and inspection system 19 such that a single camera may provide images for both systems. In some embodiments, the or each image may be provided independently of the autonomous vehicle 1. For example, the or each image may be captured by a camera which does not form part of the autonomous vehicle 1 but which may form part of the base station 2, for example, or which may be captured by a handheld camera operated by a human user.

The or each image may include an image of at least part of the object 5 and which may include substantially all of the object 5.

In some embodiments, such as those using a skeletal model, the model may be parameterized using one or more such images (and may also use information from the initial setup program) using the mapping and/or localization processes described herein in relation to skeletal models.

In order to determine an initial flight plan, the navigation program may take into account the operational characteristics of the inspection system 19.

The navigation program may be configured to receive, or may be pre-programmed with, information regarding the operational characteristics of the inspection system 19 (e.g., the or each inspection sensor 191). In some embodiments, the inspection system 19 is configured to provide the navigation program with this information (e.g., the inspection system computer 192). In some embodiments, the navigation program may obtain the information from the remote server 3 or may already have the information as part of the navigation program.

The operational characteristics of the inspection system 19 may include, for example, one or more of:

a maximum distance the inspection system 19 can be from the object 5 for an accurate inspection (e.g., at a desired minimum resolution), a minimum distance the inspection system 19 can be from the object 5 for an accurate inspection, a field of view of the inspection system 19 (which may be linked to a distance between the inspection system 19 and the object 5), a resolution of the inspection system 19, a variation in resolution of the inspection system 19 with respect to an angle between the inspection system 19 and the inspection target taking into account any curvature of the object 5 at the inspection target (which may influence, therefore, an effective field of view of the inspection system 19), a minimum setup time for an inspection operation (i.e., a minimum time at which the inspection system 19 has to be at the inspection location before an inspection operation can occur), a minimum inspection operation time (i.e., a minimum time at which the inspection system 19 has to be at the inspection location for an inspection operation to occur), a range of movements (e.g., changes in orientation) of the field of view (or effective field of view) of the inspection system 19 with respect to the vehicle 1 (in some embodiments, the or each inspection sensor 191 may have constrained changes in orientation with respect to the vehicle 1), and a minimum unset time (i.e., a minimum amount of time for the inspection system 19 to adopt a mode of operation suitable for movement of the autonomous vehicle 1—which may include covering an inspection sensor 191 for example (e.g., to avoid contamination during the flight) and this may only apply to some inspections).

The field of view (or effective field of view) of the inspection system 19 may include an area or volume which can be covered by the inspection system 19 from one inspection location (e.g., at a particular distance from the inspection system 19) and may include a depth range. For example, an inspection sensor 191 may have a field of view (or effective field of view) associated with a particular distance of the inspection sensor 191 from the object 5 but that field of view may encompass variations in that distance (i.e., depth) within a predetermined range. One example would be a camera 191a, which can be focused to a particular distance but parts of the object 5 which are at that distance or within a given range of variation of that distance (i.e., depth variation) from the camera 191a will also be in sufficient focus for the inspection operation.

These operational characteristics may be provided for the inspection system 19 as a whole or in relation to the or each respective inspection sensor 191.

In order to determine an initial flight plan, the navigation program may take into account the operational characteristics of the vehicle 1 (in addition to or instead of the operational characteristics of the inspection system 19).

The navigation program may be configured to receive, or may be pre-programmed with, information regarding the operational characteristics of the vehicle 1. In some embodiments, the fight control system 15 is configured to provide the navigation program with this information. In some embodiments, the navigation program may obtain the information from the remote server 3 or may already have the information as part of the navigation program.

The operational characteristics of the vehicle 1 may include, for example, one or more of:

- possible degrees of freedom of movement of the vehicle 1;
- one or more costs associated with one or more movements of the vehicle 1;
- a maximum altitude of the vehicle 1 (or other maximum range of the vehicle 1); and
- a power capacity of the vehicle 1.

Figure 6:
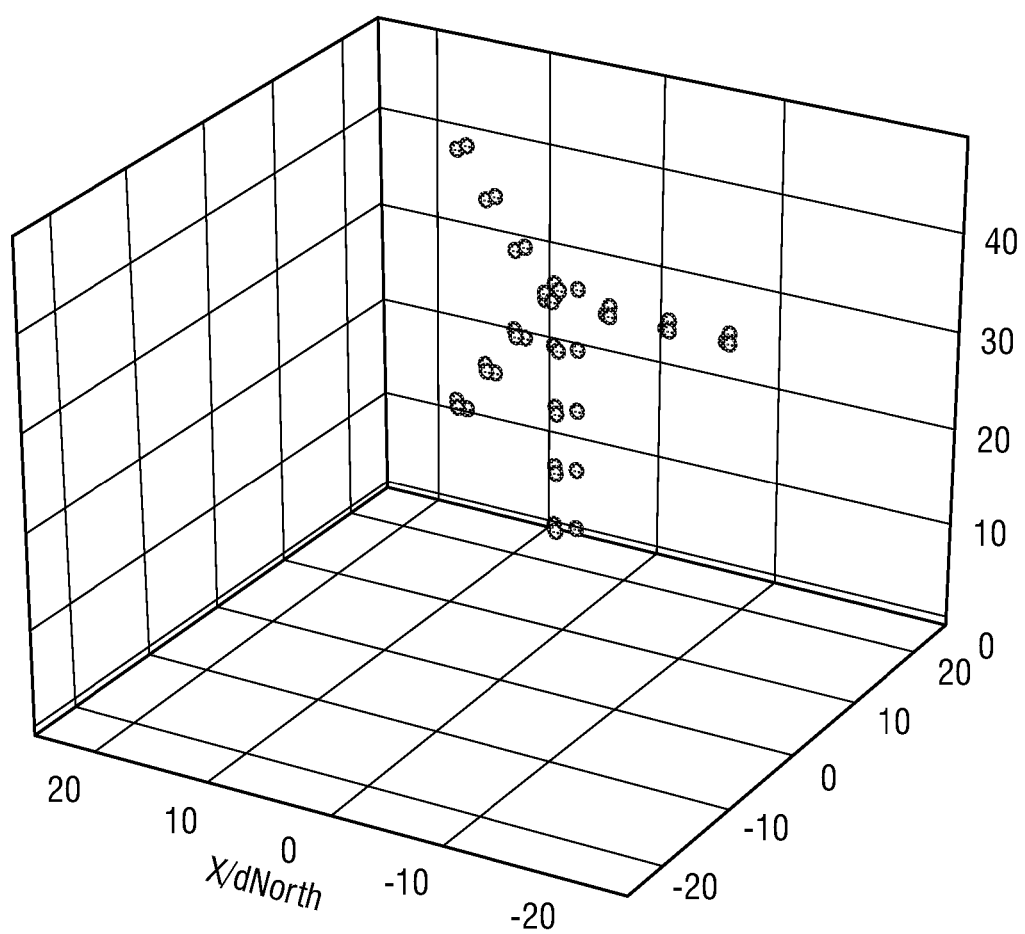
FIG. 6 shows inspection targets in relation to a wind turbine.

The navigation program may be configured to determine one or more inspection targets relative to the model (i.e., representation) of the object 5 using one or more of the operational characteristics of the inspection system 19—see FIG. 6, for example, which shows a collection of inspection targets—and/or one or more operational characteristics of the vehicle 1.

An inspection target may be a point which is on a surface of the model which is to be the target of an inspection operation by the inspection system 19 of the autonomous vehicle 1.

The or each inspection target may be based at least in part on, for example, one or more of: the initial setup parameters, an aim to inspect substantially an entire surface of the object 5 or a part of the object 5 (such as the blades of a wind turbine), operator defined inspection targets (e.g. identified by the operator using the operator interface 42 which may display a graphical representation of the model), and one or more previous inspections of the object 5 (such information may be provided by the remote server 3, for example).

The or each inspection target may be determined using the one or more operational characteristics of the inspection system 19 so as, for example, to ensure the desired coverage of the inspection (e.g., by virtue of the combination of inspection operations (although there may only be one in some embodiments)). Accordingly, the or each inspection target may be selected to ensure that one or more of the inspection operations have overlapping coverage at one edge, at least. In some embodiments, a desired non-overlapping spacing of inspection targets (i.e., negative overlap or negative distance/spacing) may be required for the inspection operation. This may be the case, for example, in relation to inspection operations comprising spot inspections.

For example, the navigation program may be configured to use the field of view (or effective field of view) characteristic to define a collection of inspection targets such that a predefined portion (which may be all) of the object 5 is covered by the inspection operations with overlaps between the inspection data to allow the inspection data from one inspection operation to be combined with the inspection data of another inspection operation. This may, of course, entail capturing (as the inspection data) a series of images (using the camera 191*a*) such that the images can be stitched together to form a larger image. The same technique (i.e., data stitching) may be used with other forms of inspection data.

In some embodiments, the navigation program may be configured to define inspection operations which have a degree of overlap which is dependent, at least in part, on an angle and/or distance of the inspection system 19 (e.g., an inspection sensor 191) with respect to the object 5 within the area of overlap. As will be appreciated, the resolution of the inspection operation 19 may vary depending on this information and so there may be a requirement for greater overlap between inspection operations if each operation has a relatively low resolution in the area of the overlap. The inspection data for overlapping inspection operations may be combined to improve the effective resolution of the inspection data in the overlap area.

The navigation program may be configured to determine one or more inspection locations and may be configured to determine at least one transition location based on the inspection targets and the model (i.e., representation) of the object 5. In other words, the navigation program is configured to determine the flight plan.

The navigation program may be configured to determine multiple different flight plans and may seek to determine an optimal flight plan based on one or more cost functions/operations.

The navigation program may be configured to determine the or each flight plan based at least in part on one or more operational constraints. The or each operational constraint may be predetermined, may be part of the initial setup parameters, may be obtained from the remote server 3, or may be input by an operator (e.g., using the interface 42).

A first example of an operational constraint is a range constraint. The range constraint may determine how close the autonomous vehicle 1 can be, during flight (in accordance with the flight plan) to the object 5. This range constraint, therefore, effectively forms an invisible wall between the autonomous vehicle 1 and the object 5 which is intended to reduce or substantially eliminate the risk of the autonomous vehicle 1 impacting the object 5.

The range constraint could be a minimum distance (or range) from any part of the model of the object 5. As such, the autonomous vehicle 1 may move around the object 5 so long as this minimum range is maintained. This may be referred to as a constant range constraint.

The range constraint could be defined as a plane relative to the object 5 (in other words a virtual plane which is a predetermined distance from the closest part of the model to the autonomous vehicle 1 through which no part of the object 5 extends (and, in some embodiments, from which there is no part of the object 5 which is within a minimum distance)). This may be referred to as a planar range constraint.

In some embodiments, the range constraint is defined as a predetermined range from an inspection target, a plurality of the inspection targets, or all of the inspection targets. This range may define, therefore, a spherical locus to which the vehicle 1 is constrained or is to be constrained. This spherical locus may be within a predetermined range of another inspection target and a range constraint may, therefore, be determined by an amalgamation of a plurality of loci. As will be understood, this locus may intersect the object 5 itself in one or more locations and the navigation program may be configured—using the processes described herein—to discount inspection locations from such parts of the locus.

As will be appreciated, the range constraint may be selected based at least in part on the operational characteristics of the inspection system 19 (at least such that the inspection system 19 is able to perform the inspection operation in relation to the object 5 at the minimum distance to the object 5 determined by the range constraint (or closer)).

In some embodiments, two range constraints may be applied—one on either of two opposing sides of the object 5, for example. As such the navigation program may be configured to define a flight path which moves the autonomous vehicle 1 past at least part of the object 5 from one range constraint to another range constraint. These two range constraints may both be planar range constraints. These two range constraints may effectively provide a first range constraint associated with a first side of an object 5 and a second range constraint associated with a second side of an object 5, wherein the two sides may be opposing sides (e.g., front and back sides of the object 5).

As will be appreciated, in some embodiments, the navigation program may seek to maintain a relatively close proximity to the range determined by the range constraint—to seek to ensure an effective inspection operation. Accordingly, which form of range constraint is used may influence the inspection locations relative to the inspection targets. In some embodiments, the or each range constraint may be selected based on one or more aspects of the inspection operation and/or the operational characteristics of the inspection system 19—e.g., to ensure the inspection operation completes successfully.

In some embodiments, the or each range constraint defines an operational zone in which the vehicle 1 is permitted to operate or in which the navigation program is permitted to define the flight path. In some embodiments, this zone is a plane (which may be a curved plane) or locus (e.g., to which the flight path is constrained or is to be constrained by the navigation program).

As will be understood, the predetermined geometrical relationship may be determined using a distance from the inspection location to the inspection target and an angle of incidence (of an inspection axis of the inspection system 19) on the curved surface from the inspection location. These two factors must be balanced against each other by the navigation program. In particular, to improve inspection resolution using a different angle of incidence typically requires the inspection system 19 to be further away from the inspection target along the range constraint plane. The navigation program may seek, therefore, to optimize the loss of resolution due to this increased distance to the inspection target with the increase in resolution due to the improved angle of incidence. The inspection axis may be defined as central axis of the field of view of the inspection system 19 (and inspection sensor(s) 191), extending from the inspection system 19 (and inspection sensor(s) 191) to the inspection target.

There may be other constraints as well which may include minimum ranges to other objects (other than the object 5 being inspected) or other parts of the object 5 being inspected.

The range of the autonomous vehicle 1 to the object 5 (and any other objects in some embodiments) may be determined by the sensor system 17—as will become apparent.

The navigation program may also determine, as part of the generation of the flight plan, an orientation of the inspection system 19 and, in particular, the one or more inspection sensors 191 with respect to the object 5. It may be that at least one of the one or more inspection sensors 191 is not omnidirectional and must be directed (i.e., pointed or positioned or oriented) towards the object 5 and, in particular, the inspection target. This may be the case in relation to a camera 191a, for example.

Figure 7:
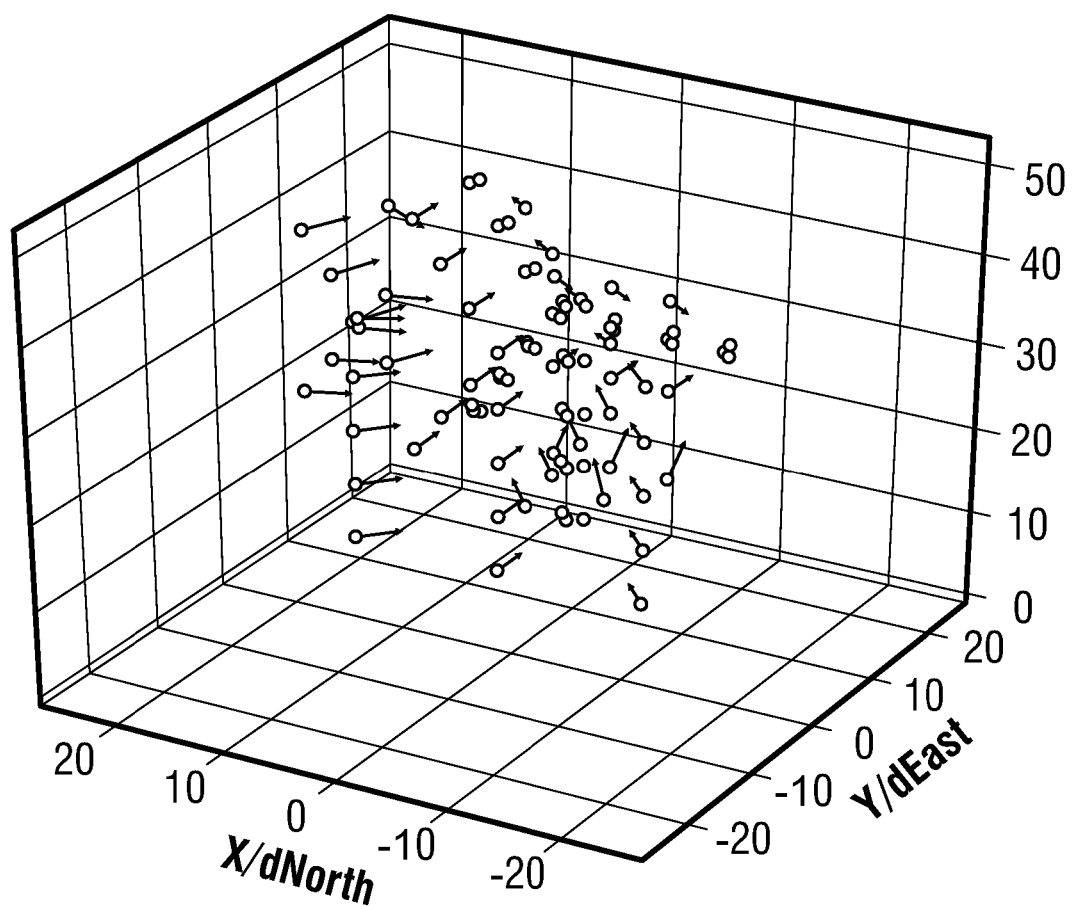
FIG. 7 shows inspection targets and inspection locations with respect to a wind turbine.

Accordingly, the navigation program may associate the or each inspection location with an inspection system orientation (as can be seen, for example, in FIG. 7). In some instances, the inspection system 19 (or at least one or more of the inspection sensors 191) may have a fixed orientation with respect to the frame 11 and, therefore, the inspection system orientation may be a required orientation of the autonomous vehicle 5 with respect to the object 5 at that inspection location (e.g., to point the or each inspection sensor 191 towards the inspection target). In some embodiments, at least one of the one or more inspection sensors 191 may be configured to move with respect to the frame 11 to change its relative orientation with respect thereto. In some embodiments, therefore, the inspection system orientation may include (in addition to or instead of an orientation of the autonomous vehicle 1 with respect to the object 5) an orientation of the or each inspection sensor 191 with respect to the object 5 and/or frame 11—and this may be provided by the navigation program to the inspection system computer 192 for use by the inspection system computer 192 to control a movement of the or each inspection sensor 191 relative to the object 5 and/or frame 11 as the flight plan is executed.

In some embodiments, the navigation program is likewise configured to use other inspection location data (the orientation being one example) which may be used by the inspection system 19 as described herein. That inspection location data may be used, in short, by the inspection system 19 to configure the or each inspection sensor 191 to perform its inspection operation (and may include a distance of the object 5 from the inspection system 19/autonomous vehicle 1 at the inspection location, for example). This enables, for example, the inspection system 19 be optimized in flight in accordance with the flight plan—see below for more details.

The navigation program may be configured to begin to determine the flight plan as, therefore, a point cloud comprising at least one inspection location (and, in some embodiments, at least one transition location). The flight plan will likely also include a start point and an end point (which may be one and the same location, which may be referred to as a home location and which may be the location at which the operator has placed the autonomous vehicle 1).

The navigation program may be configured to perform three operations in relation to the flight plan:
 (i) a location safety assessment;
 (ii) an effectiveness assessment; and
 (iii) a movement safety assessment.

In some embodiments, these three operations may be performed in relation to the or each inspection location (and may be performed in relation to one or more transition locations).

In the location safety assessment, the navigation program is configured to determine if a particular location is a safe location for the autonomous vehicle 1 to be. This may include, for example, assessment of the one or more constraints discussed above. In some embodiments, this assessment is based on one or more environmental factors (such as wind speed, wind direction, current speed, current direction, angle of slope on which the autonomous vehicle 1 is located, etc.). In particular, a safe distance from a particular object (be it the object 5 to be inspected or another object) may be smaller in low wind speed conditions (compared to high wind speed conditions) and safe distances may vary depending on the direction of the wind.

If a location (inspection or transition) is found not to pass (i.e., to fail) the location safety assessment, then that location may be deleted or moved (i.e., are rejected) by the navigation program.

In some embodiments, the location safety assessment may include the assigning of a location safety score of a location based on one or more constraints and/or environmental factors—with the location safety score indicating the perceived safety risk of that location.

The effectiveness assessment is performed at least in relation to the or each inspection location. In accordance with this assessment, the navigation program is configured to determine whether the relevant inspection target is likely to be inspectable by the or each inspection sensor 191 of the inspection system 19 from that inspection location (e.g., with a required minimum resolution and without obstruction). In relation to some objects 5, such as a wind turbine for example, the position of one part of the object 5 (e.g., a blade) with respect to another (e.g., a tower) may determine whether a part of that object 5 will be between the inspection target and the inspection location (i.e., block the inspection target). This may be a particular problem for wind turbines with an inspection of a blade which is located adjacent and substantially parallel to the tower (thus limiting access to a portion of the blade closest to the tower).

In order to perform the effectiveness assessment, the navigation program may be configured to project (e.g., using ray tracing) the field of view of the or each inspection sensor 191 onto the object 5 (i.e., the model of the object 5). In some embodiments, the navigation program may be configured to perform this projection onto the surface of the model of the object 5 which is of interest and may exclude one or more (or all) portions of the field of view of the or each inspection sensor 191 which extend beyond this area of interest. This may help to reduce the rejection of otherwise suitable inspection locations due to blocking of an unrequired portion of the field of view of the or each inspection sensor 191, for example. Accordingly, locations which do not pass (i.e., fail) the effectiveness assessment are deleted or moved (i.e., are rejected) by the navigation program. In some embodiments, the effectiveness assessment may include the assigning of an effectiveness score based on the perceived effectiveness of the inspection operation from that inspection location.

The movement safety assessment is performed by the navigation program to determine whether a location (which may be an inspection location but may be a transition location in some embodiments) is safe to move to and away from. This may include assessment of the constraints mentioned above. Again, in some embodiments, the movement safety assessment may include the assigning of a movement safety score based on a perceived safety risk associated with the movement. One or more transition locations may be added to the flight plan as part of the movement safety assessment to ensure that the movement is safe for a given location.

In order to aid in one or more of these three operations, the navigation program may use one or more additional models of the object 5 which may take different forms.

The navigation program may, therefore, be configured to generate a point cloud which includes a plurality of inspection locations and which may include one or more transition locations. The navigation program has not yet, at this stage of some embodiments, sequenced the locations into a flight plan.

As will be understood, from the point cloud of locations (which may be only inspection locations but might include one or more transition locations), a large number of possible flight plans could be determined. Typically, each such flight plan would include additional transitional locations, for example, to define the flight path between the inspection locations.

The point cloud is assessed by the navigation program to select one of the possible multitude of possible flight plans. This process may be referred to as the flight plan selection process.

The flight plan selection process may use one or more of a number of different methods.

The flight plan selection process may include a search for different possible flight paths. This may be performed using a suitable search approach such as a breadth first search, a depth first search, a greedy algorithm, Dijkstra's algorithm, an A* algorithm, and/or any suitable graph search technique. In some embodiments, the flight plan selection process includes an operator selection of one or more portions of the flight path (which may be input using the operator interface device 4).

The flight paths which are determined by the navigation program may, therefore, include one or more transition locations which are determined by the flight plan selection process, and one or more inspection locations (and may include one or more predetermined transition locations).

The different possible flight paths determined by the navigation program using a search approach are then costed based on a cost criterion and ordered according to that cost criterion.

The costing process of the navigation program may be based on one or more possible cost criterion such as distance, time, power consumption (from the power source 14), and the like. In some embodiments, the costing process may order the different possible flight paths based on time (i.e., flight or travel time).

In some embodiments, one or more cost criteria are converted into costs in common different criterion such as power consumption or distance. In some embodiments, for example, one or more non-time related cost criteria are converted into time-based costs for assessment in the costing process. In some embodiments, a distance of the autonomous vehicle 1 to the object 5 may be included in the costing process (including, for example, a predicted speed of the autonomous vehicle 1). In some embodiments, an angular deviation between an angular position of the autonomous vehicle 1 and the angular position of one or more of the inspection sensors 191 may be included in the costing process (including, for example, an angular speed of the autonomous vehicle 1 or mounting device of the inspection system 19). In some embodiments, a time penalty may be applied for transitions between movement to inspect one part of the object 5 with respect to another (e.g., the blades with respect to the tower, and/or a front of the object 5 with respect to a back of the object 5).

The costing process may be configured to select the lowest cost flight path from the different flight paths.

The costing process may take into account the location safety score and/or the effectiveness score and/or the movement safety score—if determined (see above).

The costing process may take into account (particularly for a planar range constraint) the balance between the distance from the inspection target and the angle of incidence—as described above. As will be appreciated, a greater distance from the inspection target may provide a wider effective field of view of the inspection system 19, which may mean fewer inspection operations are required but that each inspection operation may include inspection data of a lower resolution in relation to the inspection target. Therefore, more inspection operations may be needed to provide the required overlap to improve the effective resolution of the inspection data. The navigation program may be configured to use these factors in the costing process.

In some embodiments the navigation program may be further configured to perform a selected flight path safety process. In accordance with this safety process, the navigation program may be configured to confirm the flight path meets one or more safety rules. The or each safety rule may include, for example, a minimum range from the object 5 and/or another object (other than the object 5). The safety process may include analysis of the or each transition location (which may be only those transition points determined by the flight plan selection process, for example).

In accordance with this safety process, the navigation program may use ray tracing techniques to consider the path between sequential locations in the flight path (be they between two transition locations, one transition location and an inspection location, or between two inspection locations, for example). The navigation program may be configured to determine if that flight path (as represented in the ray tracing technique) would intersect the object 5 (or another object) or would pass within the minimum range of the object 5 (or other object) or would pass into a restricted geofence or out of a permitted geofence. If this in the case, then the navigation program may be configured to move one or more transition locations (determined in the flight plan section process, for example), to delete one or more such transition locations, and/or to add one or more additional transition locations—all with a view to reducing the risk of the autonomous vehicle 1 impacting the object 5 (or other object). Any moved transition locations, for example, or otherwise altered flight path may be re-assessed by the navigation program using the assessments mentioned above. In addition, or alternatively, any new flight path may be compared, again, against other flight plans (e.g., using the costing described herein) to determine if it is still to be the selected flight path or if a different path (and, therefore, plan) should be adopted.

The navigation program may be configured to record and store information about the operation of the vehicle 1 during implementation of a flight plan—i.e., as the vehicle 1 moves along the flight path performing inspection operations. This information may be stored as a log, for example, and may be sent to the communication system 18 for transmission and storage remotely from the vehicle 1, for example. This remote storage may be in the base station 2 and/or remote server 3, for example.

In some embodiments, the navigation program may be configured to resume an interrupted flight plan. For example, the navigation program may be configured (e.g., under operator instruction using the operator interface device 4) to select information stored about a partially completed flight plan. The navigation program may be configured to resume this partially completed flight plan and may seek to avoid re-inspection of any inspection locations already the subject of an inspection operation (during the partial completion of the flight plan).

This may enable, for example, a flight plan which is terminated or suspended mid-flight to be completed efficiently. A mid-flight termination or suspension may be due, for example, to power or time constraints or a safety issue being identified.

In some embodiments, the navigation program may be configured to resume the flight plan without recalculation of the flight plan—other than the new portion of the flight plan required to move the vehicle 1 to what will be the starting location of the resumed flight plan.

In other embodiments, the navigation program may be configured to recalculate the flight plan for the inspection targets which were not the subject of inspection operations during the terminated or suspended flight plan. As will be appreciated, the navigation program may be configured to determine new inspection locations and/or a new flight plan as a result and this may take into account a potential change in the object 5—such as movement of one part thereof with respect to another part. Changes in the object may be determined by the navigation program as part of updating the model as discussed herein.

In other words, the navigation program may be configured to generate a new flight plan based at least in part on the stored information about a previous partially implemented flight plan (i.e., a flight plan which a vehicle 1 began to follow but which the vehicle 1 did not complete).

The navigation program may be configured, as described above, (via the safety process and/or the costing process) to determine and select a flight plan. This flight plan may be, however, based initially on relatively rudimentary information about the location of the autonomous vehicle 1 relative to the object 5 and the configuration of the object 5.

In other words, this flight plan is initially based on a model (i.e., a simplified representation) of the object 5 and approximate relative location information for the object 5 and the autonomous vehicle 1.

Therefore, the navigation program may be further configured to receive information from the sensor system 17 from which one or more of the geographic location of the autonomous vehicle 1, the geographic location of the object 5, the relative location of the autonomous vehicle 1 to the object 5, and the configuration of the object 5, may be updated or refined. Using this information, the model of the object 5 used for the flight planning may be altered and this may, in turn, cause the navigation program to revise the flight plan using the processes described herein to regenerate the flight plan or a part thereof.

Accordingly, the navigation program may be configured to perform a mapping process and/or a localization process. The mapping and/or localization processes may be performed during flight (i.e., movement) of the autonomous vehicle 1. As discussed, this may result in a new model—which may be the same nominal model as the initial model but parameterized with one or more updated parameters.

The mapping process may include one or more of determining or refining a configuration of the object 5. The localization process may include determining a relative location of the autonomous vehicle 1 with respect to the object 5—which may include determining a location of a model of the object 5 determined in the mapping process (which may be a location relative to the vehicle 1 (e.g., relative to the inspection system 19) and may take into account the orientation of the vehicle 1 (e.g., yaw, pitch, and roll)). These processes may be executed during movement of the autonomous vehicle 1 in parallel or in a repeating sequential manner.

In some embodiments, the mapping and/or localization processes may include the steps of receiving sensor data from the sensor system 17 (e.g., from one or more of the sensors 171). This sensor data may include location information and information from, for example, a ranging sensor 171 or camera 171 of the sensor system 17. As mentioned herein, the camera 171 of the sensor system 17 may also be the camera 191a of the inspection system 19, for example.

The mapping and/or localization processes may include the processing of the received sensor data to cluster or split the data into two or more clusters or portions—i.e., to form clustered sensor data.

The clustered sensor data may then be analyzed as part of the mapping and/or localization process to identify one or more parts of the object 5 represented by each of the clusters or portions in the clustered sensor data.

The mapping process may include the determining of the relative position (which may include a location and/or orientation or other configuration) of one cluster or portion with respect to another. This relative position represents the relative position of the corresponding identified part or parts of the object 5 with respect to each other. Accordingly, the mapping process may determine information about the configuration of the object 5. This may include determining one or more transforms to shift the initial model to match the information about the configuration of the object 5. This may include adjustments to one or more of the parameters of the initial model.

The localization process may include the determining of the relative position (which may include a location and/or orientation or other configuration) of one cluster or portion with respect to the vehicle 1 (e.g., with respect to the inspection system 19). Accordingly, this relative position represents the relative position of the object 5 (or a part thereof) with respect to the vehicle 1 (e.g., with respect to the inspection system 19). The relative position may be determined in terms of a global frame of reference and may be referred to as the object location, for example. This may include determining one or more transforms to shift the initial model to match the information about the relative position of the object 5. This may include adjustments to one or more of the parameters of the initial model.

In some embodiments, the sensor data may include one or more images, which may be visible light images or infrared or ultraviolet light images. The mapping and/or localization processes may be performed on this sensor data in a similar manner, with parts of the images identified as corresponding to parts of the initial model. This information may then be used as described above in the determining steps of the mapping and/or localization processes. This may result in another in-flight model which may be combined with other models and/or used to modify the initial model for further use by the navigation program.

For example, in the case of the use of a skeletal model, a localization process (which may be part of the operation of the navigation program) may, in some embodiments, include the receipt of one or more images including image data relating to at least part of the object 5 (and, in some instances, an image may include image data relating to substantially all of the object 5).

Figure 16:
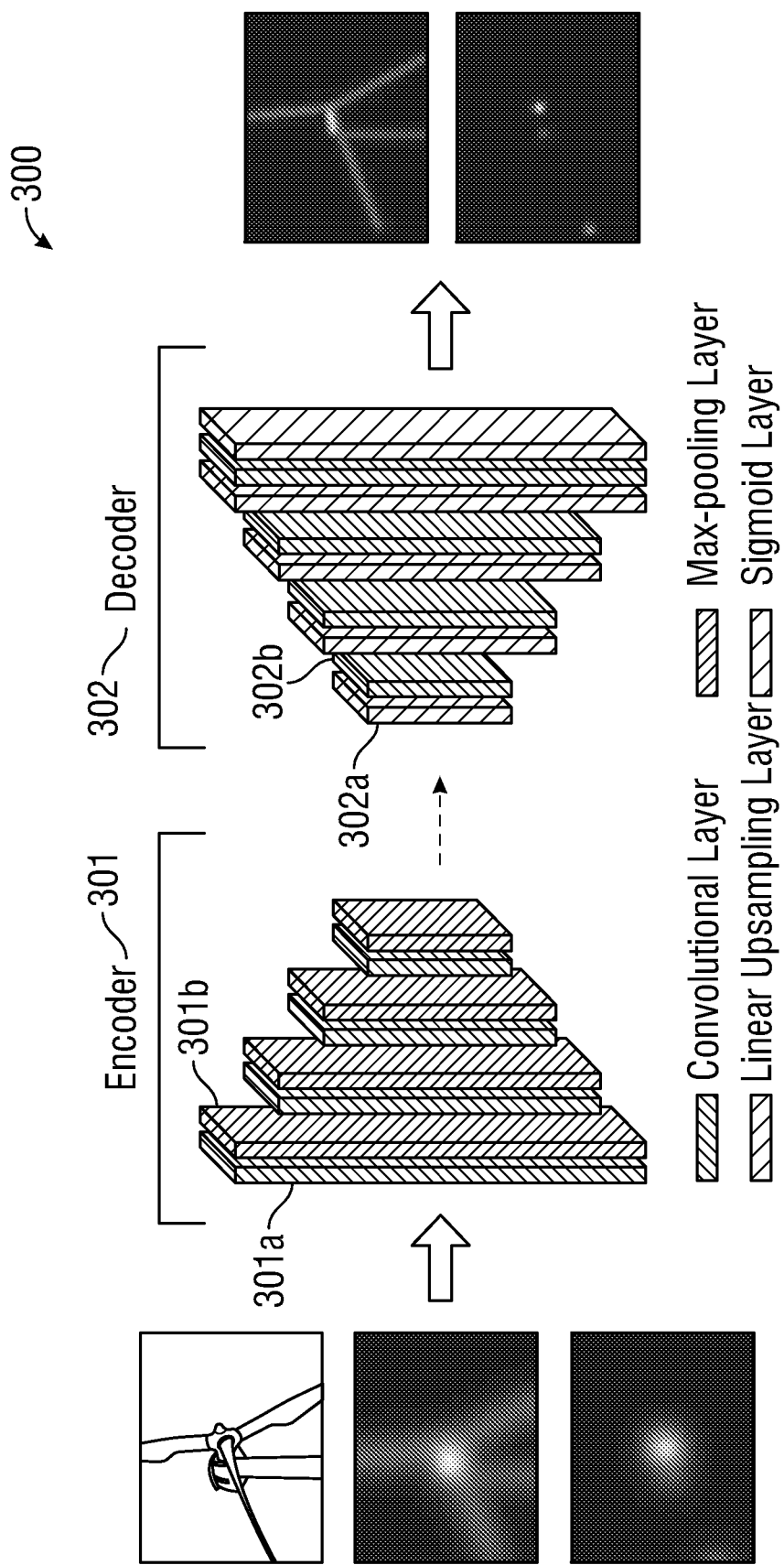
FIG. 16 shows a CNN architecture of some embodiments.

The localization process may take the or each image and pass the image data from the or each image through a convolutional neural network (CNN) 300 (see FIG. 16, for example, which shows a CNN architecture along with input and output images) to process the image data into a form which can be matched to the skeletal model so that the location of the autonomous vehicle 1 can be determined.

The CNN 300 may, therefore, take an image (which may be a multichannel image) as an input and produce another image (which may be a multichannel image) as an output. The input image will be referred to as input image data and the output as output image data. Both the input and output image data represent the object 5 (or a part thereof) and may be in the form of a skeletal and/or point-based representation of the object.

The input image data may be in the form of a red-green-blue image data. In other embodiments, the input image data may be of a different form.

The CNN 300 may use a convolutional-deconvolutional architecture to generate the output image data from the input image data.

Accordingly, in some embodiments, the input image data is successively convolved and downsampled (e.g., using a pooling technique such as max-pooling up to a bottleneck of CNN 300). These processes are then followed, in some embodiments, by convolution and upsampling (e.g., up to its original spatial dimensions).

As such, the CNN 300 may be of an architecture which may include an encoder 301 (in the form of a sequential series of convolutional layers 301*a*, each followed by a pooling layer 301*b*) and a decoder 302 (in the form of a sequential series of linear upscaling layers 302*a*, each followed by a convolution layer 302*b*).

In some embodiments, this type of architecture is beneficial in that visual information (in the input image data) from across the spatial range of the image input data is brought together in a deep part of the network to provide feature rich information to an output of the decoder 302 (which is a deconvolutional part of the convolutional-deconvolutional CNN 300 architecture).

The feature lines 202 and/or feature points 201 may be classified in the model based on the part of the object 5 which the feature lines 202 and/or feature points 201 represent. In the case of a wind turbine as the object 5, the first feature line 202*a* may be a first class, the second feature line 202*b* may be a second class and the plurality of third feature lines 202*c* may collectively be a third class. In some embodiments, however, each of the third feature lines 202*c* has its own class. In some embodiments, the feature points 201 may be classified with each feature point 201 forming a class. In some embodiments, however, the feature points representing each distal blade tip may be collectively one class.

The output image data produced by the CNN may be in the form of a prediction of the projection of the skeleton model, given the pose and parameters of the camera from which the input image data was captured. Each channel of the output image data may correspond to a different class of the skeleton model. In the some embodiments, the output image data may, therefore, include seven channels which correspond to the seven classes in the skeleton model of some embodiments.

In some embodiments, the input image data is captured by a camera and is associated with metadata. This associated metadata may include location and/or direction data. In some instances, the input image data has been captured by a camera which is carried by the autonomous vehicle 1 (e.g., by the camera 191*a* or one of the one or more sensors 171). As such, the metadata may be determined by one of the one or more sensors 171 and may include, for example, location and/or direction data obtained using the radio navigation sensor. The location and/or direction data may include information representative of a pose of the camera which captured the input image data.

The metadata may be used to assist the CNN in its operation. This may be achieved by using the metadata and the skeletal model (i.e., to form a prior). In particular, in some embodiments, the localization process may include generating an estimate of the skeletal model projected onto the input image data or otherwise into the frame of reference to the camera or other sensor which captured the input image data (i.e., an imaging sensor).

The localization process may be configured to use the metadata and the parameterized skeletal model (which may be received as part of the localization process), along with one or more parameters associated with the imaging sensor (e.g. inspection system parameter) which generated the input image data, in order to determine a projection of the skeletal model into the frame of reference of the imaging sensor or otherwise into the input image data. The one or more parameters may include, for example, the intrinsic parameters of the camera (or other imaging sensor). This projection of the skeletal model will generally be referred to as the projected skeletal model.

The intrinsic parameters of the camera (or other imaging sensor) may refer to, for example, nine values which determine the camera (or other imaging sensor) intrinsic matrix and are used for the projection of 3D points into a 2D image plane. These parameters are typically a fixed property of the camera (or other imaging sensor) and are typically predetermined parameters. In some embodiments, a set of distortion parameters may be used. This set of distortion parameters may be used in conjunction with the intrinsic parameters of the camera or other imaging sensor when mentioned herein (e.g., to project the 3D points into the 2D image plane). The set of distortion parameters may include a plurality of parameters which are intended to correct the input image data in light of distortions in a lens of the camera (or other imaging sensor). In some embodiments, the plurality of parameters forming the set of distortion parameters may include 4, 5, 8, 12, or 14 parameters. The set of distortion parameters may, similar to the intrinsic matrix of the camera (or other imaging sensor), be a predetermined property of the camera (or other imaging sensor). The set of distortion parameters may, therefore, be predetermined parameters.

In some embodiments, the localization process is configured to perform a smoothing operation (such as Gaussian smoothing) on the projected skeletal model.

The projected skeletal model may then be appended to the input image data as additional channels of the multi-channel input image data, in some embodiments. The first feature line 202a projection may form one channel, the second feature line 202b projection may form a second channel, and the plurality of third feature lines 202c as projected may form a third channel. In the case of embodiments with red-green-blue input image data, this will form three channels (e.g., fourth-sixth channels). The feature point 201 projections may each form a channel (again with all the projections of the distal blade tips forming one channel).

Therefore, additional channels may be added by the localization process to the input image data prior to processing of that input image data by the CNN 300. This may, due to the accuracy of the projection of the parameterized skeletal model, aid in the operation of the CNN 300.

Training of the CNN 300 may have been implemented prior to the localization process described above in relation to the skeletal model. Training may be based on real data or simulated data. Training may be undertaken using an Adam optimizer but other optimizers are also envisaged.

The localization process can, therefore, generate an output image data from which the pose of the autonomous vehicle 1 can be determined and/or refined. In order to do this, a pose graph is used by the localization process. This process may be a pose optimization process.

A pose graph may be used to estimate the position and orientation (i.e., pose) of the imaging sensor of the autonomous vehicle 1 (relative to the object 5 and/or in absolute terms) and is an example of pose data. References herein to a pose graph may, therefore, refer to pose data in general. Accordingly, as the autonomous vehicle 1 performs an inspection of the object 5 a new node or keyframe may be added to a pose graph. These may be added at intervals during the operation of the vehicle 1. In some embodiments, these intervals may be predetermined regular intervals (i.e., with a constant interval timing). In some embodiments, the interval timing may be dynamically determined based on one or more operational aspects of the autonomous vehicle 1. These one or more operational aspects may include distance travelled by the vehicle 1 (which may be a rotational and/or linear distance travelled), and/or overlap between image data gathered by the imaging sensor (e.g., the camera frustum overlap).

As will be appreciated, the orientation of the imaging sensor with respect to the frame 11 of the autonomous vehicle 1 and/or with respect to any sensor 171 which is used to determine the location of the autonomous vehicle 1 (such as radio navigation sensor) may be varied in some embodiments—e.g., if the imaging sensor is mounted using a moveable mounting. The relative orientation of the imaging sensor with respect to the frame 11 and/or the sensor 171 used to determine the location of the autonomous vehicle 1 may be known from a sensor associated with the mounting for the imaging sensor. Accordingly, this information may be used to determine the pose of the imagining sensor when provided with a pose of the vehicle 1. In some embodiments, the imaging sensor is fixed with respect to the frame 11 and/or any sensor 171 which is used to determine the location of the autonomous vehicle 1; therefore, the pose of the vehicle 1 is also the pose of the imaging sensor.

Each node added to the pose graph may contain an estimate of the pose of the camera or other sensor of the autonomous vehicle 1 and this estimate may be an absolute pose estimate. The pose graph, therefore, may represent a plurality of poses.

Each pose may be defined as:

$$T_i = (R_i, t_i) \qquad (1)$$

where $R_i$ is the orientation of the autonomous vehicle 1, and $t_i$ is the position of the vehicle 1 in three dimensions.

As mentioned, each pose may be an absolute pose and may be determined by the navigation program, for example. The absolute pose may be determined using one or more of the sensors 171 of the sensor system 17. This may include, for example, the use of the radio navigation sensor. Therefore, this pose may be referred to as a measured pose of the imaging sensor of the autonomous vehicle 1.

The poses forming the pose graph may be optimized under a set of constraints with a view to converging the poses to the true location and orientation, $T_i^*$, of the imaging sensor of the autonomous vehicle 1.

The set of constraints (which may be referred to as graph constraints), may be formed based at least in part on estimates of the pose of the autonomous vehicle 1 (and/or the imaging sensor of the autonomous vehicle 1) and an output of the CNN (i.e., the output image data).

The estimates of the pose of the imaging sensor of the autonomous vehicle 1 at each node (e.g., the measured pose) may not be used in the optimization process. Instead, in accordance with some embodiments, consecutive poses (or substantially consecutive poses (i.e., not immediately consecutive poses)) are paired to determine a relative pose. For example, relative pose offset is determined by the poses at keyframes $T_i$ and keyframe $T_{i-1}$:

$$T_{i,i-1} = \begin{bmatrix} t_{i,i-1} \\ q_{i,i-1} \end{bmatrix} = \begin{bmatrix} R_i^T(t_{i-1} - t_i) \\ q_i^{-1} * q_{i-1} \end{bmatrix} \quad (2)$$

where $q_i$ is a quaternion representation of the orientation $R_i$ of the vehicle 1.

The use of relative pose changes may be beneficial as, for example, over a short period of time errors in the measured pose are likely to be lower than over a longer period of time.

Optimization of the pose graph may be undertaken using a cost function, E, which is configured to determine a residual error between an expected pose, $\hat{T}_i$, given the current state of the optimized pose graph and the measured pose of the imaging sensor of the autonomous vehicle 1:

$$E = \sum_i e_{i,i-1}^T + \sum_i e_i^I \quad (3)$$

The optimal set of poses are those which minimize this function. The optimized set of poses forming a new state of the optimized pose graph (effectively replacing the former state of the pose graph).

In this cost function, E, $e_{i,i-1}^T$ is intended to compare the relative pose of the expected poses, $\hat{T}_{i,i-1}$, with corresponding ones of the measured poses:

$$e_{i,i-1}^T = C \begin{bmatrix} \hat{t}_{i,i-1} - t_{i,i-1} \\ 2 \times Vec(\hat{q}_{i,i-1} * q_{i,i-1}^{-1}) \end{bmatrix} \quad (4)$$

where Vec corresponds to the vector part of the quaternion rotation, and C is a diagonal matrix weighting the different elements of the cost.

The weighting of the different elements of the cost, C, may be determined using, for example, covariances of the measured poses, or may be set based on expected errors in the measured poses. Each term may be weighted in translation error by $\beta^t$ and those in rotation error by $\beta^q$.

As a result, $e_{i,i-1}^T$ may be a 6D vector containing the residuals in rotation and translation.

A cost function for the image measurements may be based on point-to-point correspondences which are established differently depending on the types of image measurements and, in particular, whether the skeletal model (or part being considered) uses feature points 201 or feature lines 202.

According, in some embodiments, correspondences between an initial skeletal model (or current skeletal model) and the output of the CNN (i.e., the output image data) may be determined using one or more active search techniques.

In accordance with a first technique, used in relation to feature points 201, for one or more of the feature points 201, $P_n^c \in \mathcal{P}^c$ an estimated location of the feature point 201 is determined within the output image data. Accordingly, for point based measurements, $I_i^P$, this may be achieved by projecting a current estimated location of the feature point 201 (e.g., from the initial model or as a result of using the mapping process (see elsewhere herein)) into the frame of reference of the camera (or other sensor) which captured the input image data—as described herein—or otherwise projected into a frame of reference of the output image data. For example, a current parameterized skeletal model may be projected into the frame of reference of the imaging sensor using one or more parameters (which may include, for example, the intrinsic parameters, K, of the imaging sensor) and using the current estimate pose of the imaging sensor, $\hat{T}_1$. This projection may be into the image plane, Vin, for example. Accordingly, the expected location of one or more feature points 201 in the output image data can be determined.

A search may then be performed to match each feature point 201 of the model with the corresponding feature represented in the output image data.

Accordingly, a search region may be defined around the expected location of the or each feature point 201 within the output image data. This search region may be defined by a radius, $r^P$, from the expected location, for example. A pixel with the highest value above a threshold, $\lambda^P$, within the search region is identified as corresponding with that feature point 201. If no pixel values exceed the threshold, then no correspondence is found. The process continues through all feature points 201.

In accordance with a second technique, used for feature lines 202, one or more points, $Q^c = \{q_1^c, \ldots, q_m^c\}$, may be determined along the feature line 202, $\mathcal{L}^c$. This may be achieved by dividing the feature line 202 into two or more sub-lines and taking the ends of those sub-lines as the one or more points (which may be referred to as line points, as they are points along a feature line 202). The number of line points used for each feature line 202 may be dependent, in part, on the length of that feature line 202. So, for example, the first feature line 202a may be divided into $s^t$ points, the second feature line 202b into $s^h$ points, and the third feature lines 202c into $s^b$ points for each of the third feature lines 202c.

These line points, $q_m^c$, may then be projected into a frame of reference of the output image data. For example, line points may be projected into the frame of reference of the imaging sensor using one or more parameters (which may include, for example, the intrinsic parameters, K, of the imaging sensor) and using the current estimate pose of the imaging sensor, $\hat{T}_1$, to form projected line points, $\hat{q}_m^I$. This projection may be into the image plane, $\hat{q}_n^I$, for example.

A search may then be performed to match each line point with the corresponding point represented in the output image data.

Accordingly, a perpendicular line search may be used to identify the corresponding points within the output image data. This may be achieved by, for example, projecting two end points of each feature line 202 into a frame of reference of the output image data (e.g., into the frame of reference of the imaging sensor, as described above). These two end points may be used to define a line therebetween in relation to the output image data (i.e., within its frame of reference). A direction perpendicular to this line (which may be a 2D line) may be a search direction for a line search.

In this search direction, starting at the projected feature line, samples may be taken of pixel values at predetermined distances from the projected feature line, $k^L$, and over a predetermined length, $a^L$. The sampled pixel with the highest value above a threshold, $\lambda^L$, is taken to correspond with the projected line point. If no pixel values exceed the threshold, then no correspondence is found. The process continues through all line points.

After the use of one or more of the active search techniques, a set of correspondences has been determined with respect to the output image data and the skeletal model.

An image cost function can then be determined as:

$$e_i^I = \beta^p \sum_n^{N_i} |\hat{p}_n^I - p_n^I| + \beta^q \sum_m^{M_i} |\hat{q}_m^I - q_m^I| \qquad (5)$$

where Ni represents to the number of point correspondences in the image frame i, and Mi represents to the number of line correspondences in image frame i.

The values $\beta^p$ and $\beta^q$ may be used to weight the different types of correspondences.

Accordingly, the cost function, E, (equation (3)), can then be used to optimize the pose graph. This may be achieved using any suitable methodology, for example, the Gauss-Newton algorithm may be used, which works by linearizing the problem around the current best guess solution, finding the minimum and repeating until convergence.

The optimization technique may be an iterative technique. One or more further constraints may be used in relation to the optimization of the pose graph. For example, the relative movement or likely movement of the autonomous vehicle 1 with respect to the object 5 since the last localization may be used to constrain and simplify the optimization. The result is a new or refined pose (i.e., location and/or orientation) of the autonomous vehicle 1 and/or the imaging sensor.

In accordance with some embodiments, therefore, there is provided a pose optimization process to optimize an approximate pose of a sensor with respect to an object 5 using sensor data. This process may include receiving a model of the object 5. Sensor data may be received relating to at least part of the object 5, wherein that sensor data may be in a sensor frame of reference and may be associated with pose data representing a pose of a sensor used to generate the sensor data. The process may include projecting at least part of the model onto the sensor frame of reference. Using this projection, corresponding feature points and/or feature lines between the model and sensor data in the sensor frame of reference may be identified. Finally, the pose data may be optimized based on the identified correspondence, using a location difference in the corresponding feature points and/or feature lines between the model and the sensor data in the sensor frame of reference.

The sensor data may be image data, for example, and this could be sensor data from a ranging sensor—which is configured to generate a sensor data representing at least part of the object 5 in the form of a range of the object 5 from the sensor which generates the sensor data.

In some embodiments, there is provided a mapping and/or localization process including the aforementioned pose optimization process followed by optimizing at least one parameter of the model of the object 5, wherein the at least one parameter defines an estimated configuration of the object 5, and wherein optimizing the at least one parameter includes optimizing the at least one parameter based on the correspondence between the feature points and/or feature lines and the optimized pose data, such that the optimized parameter represents the configuration of the object 5.

Figure 17:
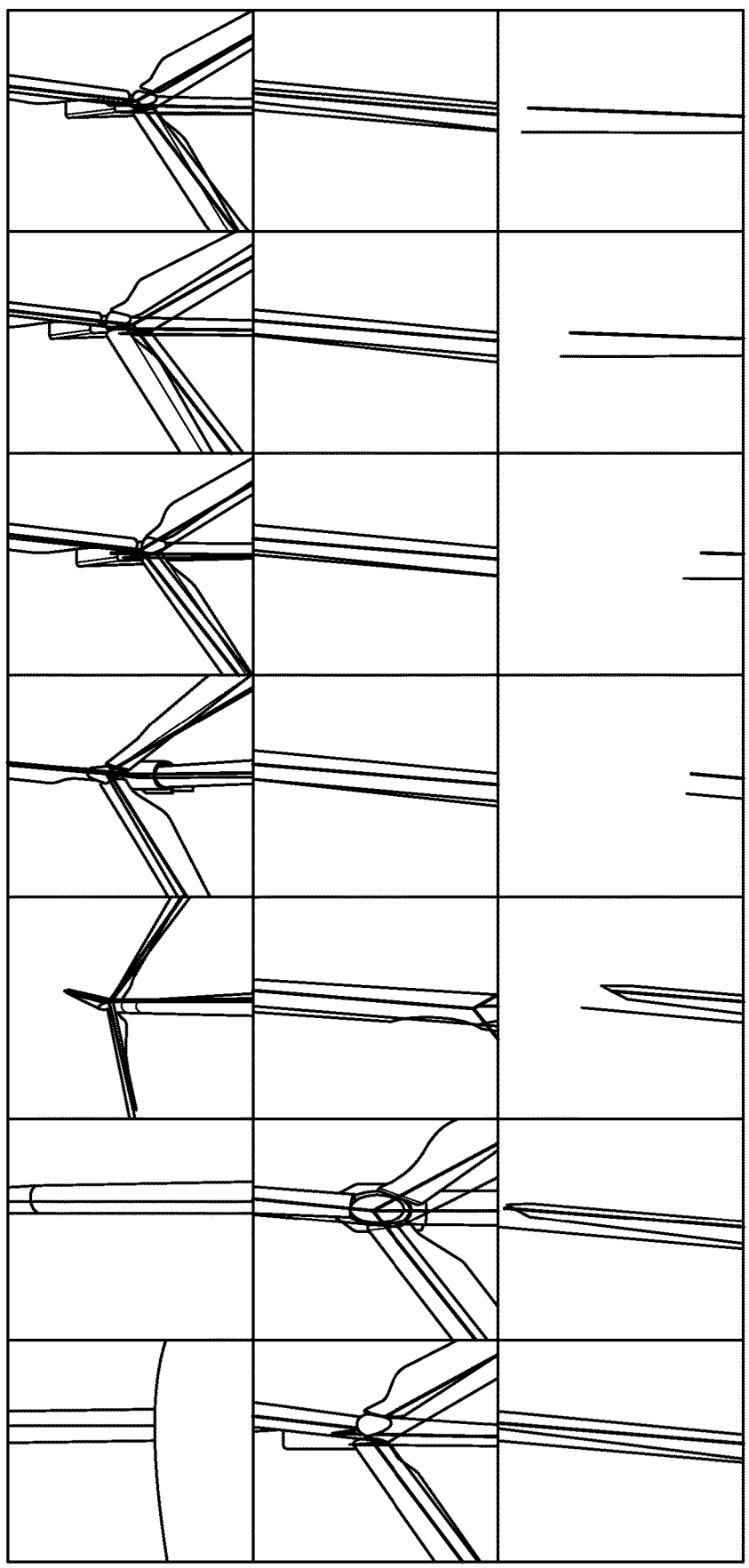
FIG. 17 shows images from an autonomous vehicle including a projection of a model onto the image, with the model shown both before and after optimization.

FIG. 17 shows the model projected onto image data from an autonomous vehicle 1, wherein the model is projected both before and after optimization—with the post-optimization model being better aligned with the image data.

The pose (i.e., location and/or orientation) of the autonomous vehicle 1 and/or the imaging sensor may be defined in terms of coordinates and orientation angles or quaternions. These may be with respect to a fixed point associated with the object 5 (such as the base or top of the wind turbine) or may be with respect to a fixed geographical point and the direction of gravity.

As discussed herein, the skeletal model may be a parameterized model which includes feature lines 202 and/or feature points 201 (i.e., at least one parameter defining a configuration of the object 5).

In order to parameterize the model, the initial information (e.g., initial setup parameters) and/or the initial setup program may be used in order to generate parameters for the skeletal model. These will, however, likely be relatively inaccurate but may, nevertheless, be acceptable for generation of the initial model (the initial model being, in this case, an initial skeletal model). As will be understood, the parameterized initial skeletal model may then be used in the localization process described herein.

In some embodiments, a mapping process is provided for the skeletal model and operated as part of the navigation program. The mapping process for a skeletal model used in some embodiments may use similar steps to the aforementioned localization process.

In particular, the mapping process for the skeletal model may include receipt of one or more images of at least part of the object 5 (e.g., the wind turbine) and may include receipt of the skeletal model (which may be parameterized using the initial information (e.g., initial setup parameters), for example). The one or more images may—as described herein—be images acquired by an imaging sensor of the autonomous vehicle 1 or may have been acquired by an independent camera or sensor for which the pose is known). The or each image is then pass through the CNN 300 which may be of identical form and operation to that described above in relation to the localization process (and may be the same CNN 300). Accordingly, the or each image may be input image data as described herein and this data may be associated with metadata as described herein.

The output image data from the CNN 300 may then be used for a comparison with the current parameterized skeletal model (which may be the initial model) in order to refine and re-parameterize the model.

This process may be similar to that described in relation to the localization process in relation to the pose graph. In particular, the current skeletal model may be projected onto the output image data and then the searching techniques described herein for feature points 201 and feature lines 202 may be implemented to determine correspondence between the current skeletal model and the output image data—see the localization process description for a more detailed explanation. The parameters of the skeletal model may then be optimized using a suitable optimization technique (such as the Gauss-Newton algorithm) in order to determine new parameters for the skeletal model. The optimization technique may be an iterative technique.

This re-parameterized skeletal model may then become the current skeletal model, and may be used by the navigation program.

The re-parameterization of the skeletal model in this manner may occur one or more times during an operation of the autonomous vehicle 1. In some embodiments, the mapping process and localization process for the skeletal model occur repeatedly in a substantially continuous manner. In some embodiments, the localization process for the skeletal model occurs repeatedly in a substantially continuous manner but the mapping process may occur less frequently—e.g., periodically or at predetermined stage(s) of the operation of the autonomous vehicle 1.

As will be understood, the described mapping and/or localization processes for skeletal models can operate using input image data which represents just part of the object 5 but, in some embodiments, the input image data provides a complete view of the object 5 (from a particular angle).

The object configuration and object location may, therefore, form a model of the object 5. The navigation program may be configured to generate multiple such models using different combinations of sensor data and/or different mapping and/or localization processes.

The navigation program may be configured to use one or more of these models (which are in-flight models) to update the initial model. This may include the combining of multiple in-flight models. The combination of in-flight models may be performed using a number of different methods—such as by taking an average (e.g., mean) of the models, using standard deviations and thresholding, or the like.

The navigation program may be configured to generate an in-flight model to replace the initial model for use in controlling the operation of the vehicle 1. This in-flight model may take into account one or more of the in-flight models which are generated as a result of the mapping and/or localization processes. In some embodiments, therefore, the replacement model may be referred to as the replacement model or the determined in-flight model. In-flight models which are used to generate the replacement model may be referred to as temporary or working in-flight models, for example.

The navigation program may be configured to exclude sensor data from one or more sensors 171 due to, for example, a detected error with the sensor 171 or sensor data which is not within an expected predetermined range or within a specified range of other sensor data. The navigation program may be configured to perform a similar process at the in-flight model level—excluding one or more in-flight models which are generated based on sensor data from a sensor 171 in relation to which an error has been detected, or based on a model which is not within a specified range of another in-flight model or models.

The processes of clustering the sensor data, analyzing the clustered sensor data, and determining according to the mapping and localization processes, may be undertaken in different ways. For example, clusters of sensor data may each be approximated to an appropriate shape which may be a 2D or a 3D shape depending on the form of the sensor data (such as a cylinder, ellipse, circle, or the like)—3D sensor data may be restricted to provide 2D sensor data in some embodiments or 3D sensor data may be used or the sensor data may be provided as 2D sensor data. The approximated shapes may then be analyzed and compared to the initial model. This may include, for example, analyzing a perimeter of the approximated shapes compared to parts of the initial model or may include analyzing centroids of the approximated shapes compared to centroids of parts of the initial model.

In some embodiments, these processes may include the use of linear regression and/or iterative closest point approaches.

In some embodiments, the sensor data is in the form of a point cloud or may be converted to a point cloud for processing according to the mapping and/or localization processes.

Turning back to the mapping process, in some embodiments, the mapping process includes the navigation program using information from the sensor system 17 to generate one or more models (herein a real-time or in-flight model) of the object 5. The in-flight model or models may be different from the model which may be used by the navigation program to determine the flight plan initially (and/or may be the same nominal model but with one or more different parameters).

The navigation program may use information received from the sensor system 17 (i.e., the sensor data, which may include range information) which represents the object 5 and the position of the object 5 relative to the vehicle 1 (e.g., relative to the inspection system 19).

The sensor data (which may be combined data from multiple sensors 171 or data from a single sensor 171) may be separated by the navigation program into sensor data relating to different parts of the initial model. This may, as described below or otherwise, include clustering or splitting the sensor data using the initial model to provide spatial constraints.

The mapping process may include clustering or splitting the sensor data into that relating to two or more different parts of the object 5. This may include splitting the sensor data into that data relating to a tower and that data relating to one or more blades, for example.

The splitting of the sensor data may be achieved in a number of different ways. For example, the sensor data (which may include range data and position data) may be used to generate a point cloud representation of the object 5, a part thereof, and/or any other nearby objects within the effective range of the sensor or sensor 171 being used.

Using a K-means approach or otherwise, the point cloud or other sensor data may be clustered—i.e., separated into the parts which represent one or more parts of the initial model (e.g., the nominal model) of the object 5.

The navigation program may then estimate a centroid or other reference point of at least one part of object 5 as represented in the clustered sensor data—e.g., taking each part of the object 5 to be represented by a shape such as an ellipse.

The navigation program may then attempt one or more transformations to compare the one or more parts of the object in the initial model of the object 5 with the one or more parts from the clustered sensor data. In this respect, the navigation program may determine one or more transformations of the centroid(s) and/or other reference point(s) with corresponding points in the initial model.

The navigation program may be configured to determine a best fit transform for the object 5 as represented in the sensor data with the object 5 as represented by the initial model 5. This may be achieved using an iterative best fit method.

Similarly, for the localization process, the navigation program may determine a best fit transformation for the location of the object 5 as a whole (or a static part thereof such as the tower of a wind turbine) relative to the vehicle 1 (e.g., relative to the inspection system 19). Again, this may use an iterative best fit method.

The navigation program may then generate a transformed initial model of the object 5 which is based on the sensor data. This transformed initial model may be the in-flight model and may be a version of the nominal model used for initial model but with updated parameters.

The mapping process may be performed less frequently than the localization process if the configuration of the object 5 is unlikely to change, for example. Alternatively, both processes can be performed on an ongoing and repeated basis.

In another version of the mapping process, a centroid of a first part of the object (e.g., the tower) is taken to be a center of the object 5. In this part of the process, a moving average may be used to smooth the estimation and accommodate false measurements. The navigation program may be configured to ignore the height of parts of the object 5 to generate a 2-D representation of the centroids of second parts (or sub-parts) of the object 5 (e.g., the blades). The navigation program may perform a linear regression on these points to estimate of the angle of the second part of the object 5 with respect to the first part of the object 5 (for example) using a gradient of the or each line generated as a result of the 2-D representation. The navigation program may be configured to cluster the centroids of the sensor data relating to the second part of the object 5 into 3 elements using a K-means approach. The navigation program may be configured to perform a linear regression to each of the clusters of the sensor data relating to the second parts of the object 5. The navigation program may be configured to generate a mean intersection point of the resulting lines representing the second part of the object 5 to determine an approximate the height of the object 5. A gradient of each of the lines representing the second part of the object 5 can be used to estimate the position of the second part with respect to the first part (e.g., blade position with respect to the tower). Accordingly, the configuration of the object 5 may be determined and the initial model updated to generate the in-flight model. Localization may be performed as described above.

Iterative closest fit and linear regression approaches have been discussed above. However, in some embodiments, the mapping and/or localization processes may use other techniques in order to generate the in-flight model.

As will be appreciated, the model of the object 5 may be determined, at least in part, based on the initial information (e.g., initial setup parameters), for example. As will be understood, the sensor data used in this process may include sensor data generated by the or each sensor 171 (which may include range information, e.g., from a LiDAR sensor, or other depth/range sensor as described herein).

Figure 8:
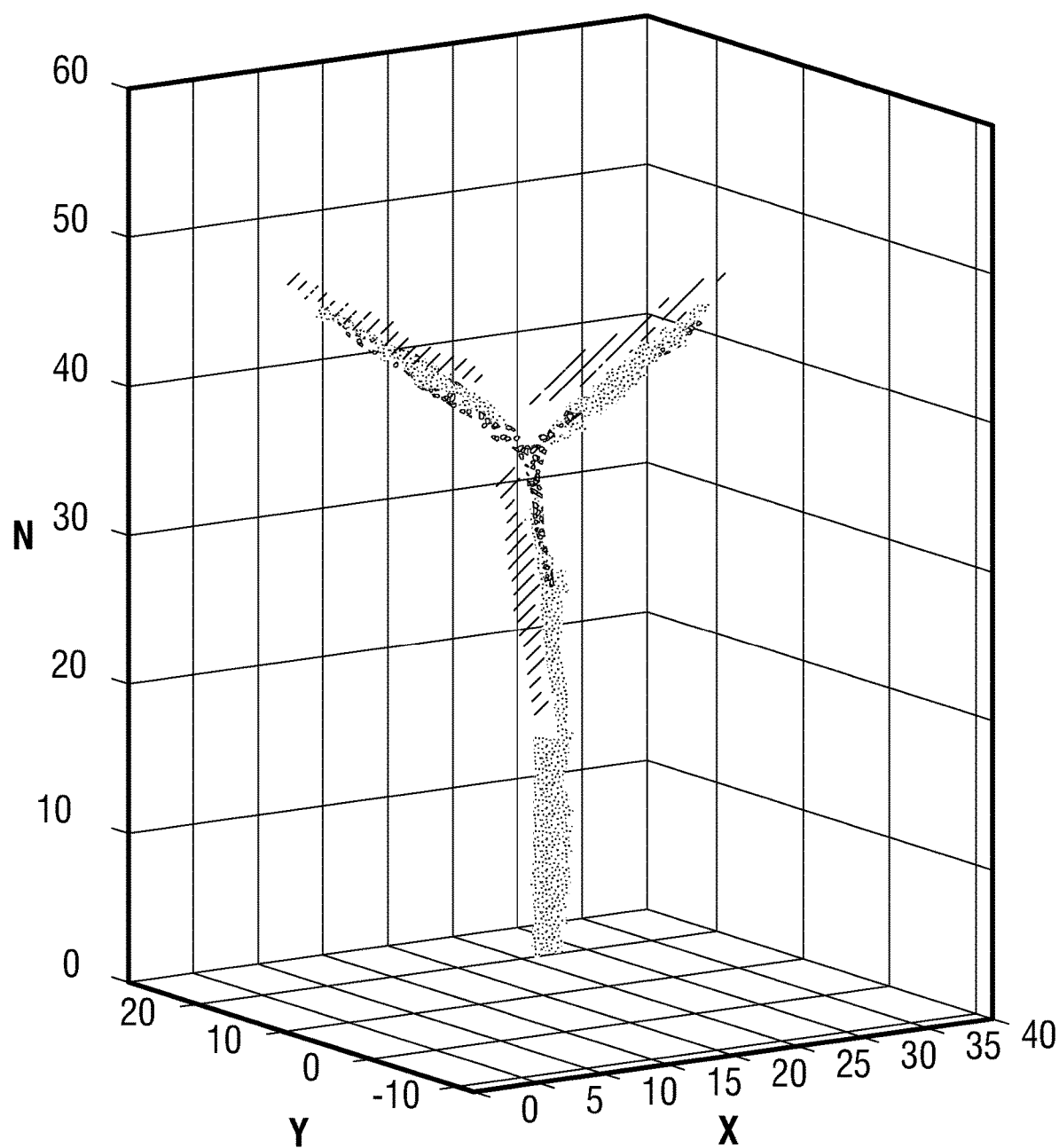
FIG. 8 shows a point cloud misalignment.

This process may be repeated in-flight—resulting in refinement of the in-flight model (see FIG. 8, for example, which shows an original model overlaid with a new representation of the blades of a turbine).

In some embodiments, the mapping and/or localization processes of the navigation program may include using one or more such techniques to generate the in-flight model. In embodiments, in which multiple techniques are used, then the results may be combined—which may be using standard deviations, an average (e.g., a mean), and may be a weighted combination based on covariance or on sensor status for the or each sensor 171 used to generate the data.

This may, in some embodiments, comprise the navigation program combining sensor data and then using the combined sensor data to generate the in-flight model or using the sensor data to generate multiple in-flight models and then combining the in-flight models.

In some embodiments, a neural network or a particle filter or a Kalman filter is used to combine a plurality of in-flight models and/or sensor data. In some embodiments, the most recent sensor data is used to generate the in-flight model. In some embodiments, the sensor data is weighted according to the sensor 171 which generated the sensor data. This may include, for example, changing the weighting in-flight during operation of the autonomous vehicle 1.

The mapping process is configured to generate the in-flight model which is then used by the localization process, which positions that in-flight model within a frame of reference used by the autonomous vehicle 1 and, in particular, by the navigation program.

In some embodiments, the mapping and/or localization processes are undertaken using multiple in-flight models which are then combined—e.g., using an average (e.g., a mean) or any other suitable method—to determine the configuration and/or location of the autonomous vehicle 1.

Thus, in some embodiments, the in-flight model is an important aspect of the operation of the navigation program. In some embodiments, therefore, the navigation program may include, as part of the flight plan, one or more transition locations which are intended to guide the autonomous vehicle 1 along an initial mapping segment of the flight plan. In this initial mapping segment, the autonomous vehicle 1 may be moved relative to the object 5 (based on the model of the object used in the generation of the flight plan, i.e., an initial model) to allow the mapping and/or localization processes to be undertaken in order to generate the in-flight model. This initial mapping segment may include, for example, controlling the movement of the autonomous vehicle 1 to travel with respect to at least a portion of the object 5 such that the at least a portion of the object 5 can be sensed by the sensor system 17—e.g., within range of the one or more inspection sensors 171.

The initial mapping segment may, therefore, be configured to cause movement of the autonomous vehicle 1 along a predetermined length of the object 5. In some embodiments, initial mapping segment may include, in addition to the movement along a predetermined length of the object, a further movement in the same direction. In particular, it will be understood that the predetermined length is determined based on the model of the object 5 (before the in-flight model has been generated). If the actual object 5 extends beyond this predetermined length, then this may be useful information for use in generating the in-flight model. The further movement in the same direction may include a movement of an additional 20% compared to the predetermined length, for example.

Figure 10:
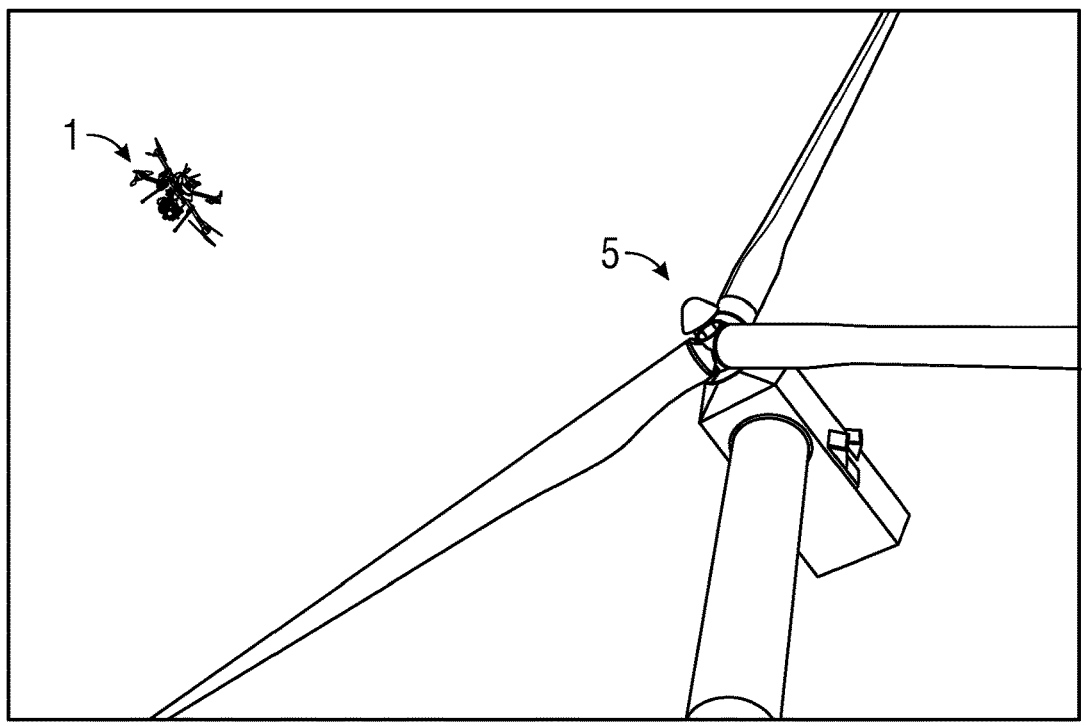
FIG. 10 shows an autonomous vehicle performing an inspection operation in relation to an object.
Figure 11:
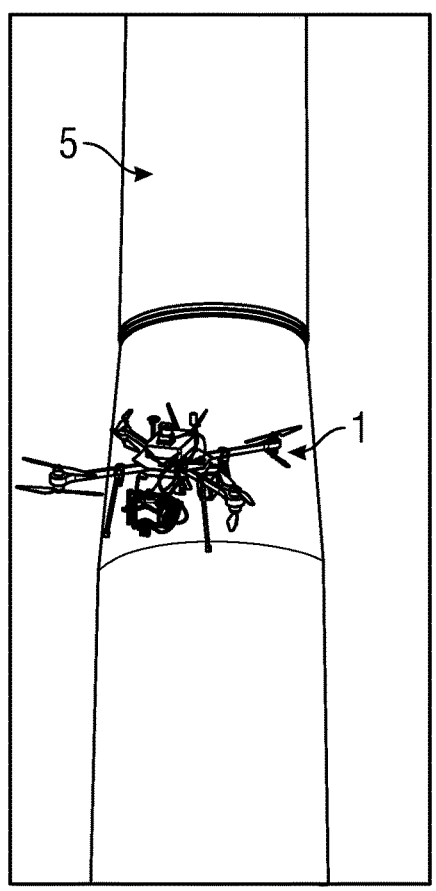
FIG. 11 shows an autonomous vehicle performing an inspection operation in relation to an object.

In the case of the object 5 being a wind turbine, then the initial mapping segment may be a movement of the autonomous vehicle 1 along a length of the tower of the wind turbine—e.g., with the autonomous vehicle 1 positioned with respect to the wind turbine such that the sensor system 17 can sense the tower of the wind turbine. In some embodiments, the predetermined distance may be a substantial part of the length of the tower. In some embodiments, the predetermined distance may be an upper length of the tower. In some embodiments, the further movement is a movement above the top of the tower (based on the model used). In some embodiments, the further movement would take the autonomous vehicle 1 to a height of 120% of the height of the tower (based on the model used). FIG. 11 shows an autonomous vehicle 1 performing such a movement along a part of the length of the tower. FIG. 10 shows an autonomous vehicle 1 approaching the top of the tower.

In some embodiments, therefore, the mapping process may occur after the autonomous vehicle 1 has been moved in accordance with the initial segment mapping of the flight plan.

In some embodiments, the localization process includes the navigation program determining the relative location of the autonomous vehicle 1 with respect to the in-flight model. In other words, the localization process may include positioning the in-flight model within a frame of reference of the autonomous vehicle 1.

In some embodiments, the localization process uses location information (i.e., sensor data) provided by the sensor system 17. The location information may include general location information—which may include sensor data from a sensor 171 which is a radio navigation sensor. The localization process may include an initial localization step in which the initial model (i.e., as used to generate the flight plan) is positioned with a frame of reference to the autonomous vehicle 1 using such general location information. In some embodiments, the localization process continues during movement of the autonomous vehicle 1 along the initial mapping segment of the flight plan. During this part, the location of the in-flight model within the frame of reference of the autonomous vehicle 1 is determined. During this stage, more specific location information may be used from one or more others of the sensors 171—such as sensor data from a ranging sensor 171 as described herein.

The localization process may continue through all or part of the movement of the autonomous vehicle 1 along the flight path under the control of the navigation program.

During the mapping and localization processes, the navigation program, adjusts the flight path so that this matches the original flight plan but now based on the in-flight model.

Accordingly, as will be appreciated, the flight plan is generated by the navigation program based on an initial model (i.e., representation) of the object 5. This model may be used to determine the inspection locations and then the required sequence of locations (inspection and transition) to define the flight path and plan. The model is configured to allow an angular position of the inspection system 19 to be determined with respect to the object 5 to ensure proper inspect of the object 5. Initial flight may be based on this model and flight plan. Then during flight, a different or refined model may be used to update the flight plan (i.e., the in-flight model). The requirements of each model are different and the use of a different model in-flight reduces the computational overheads associated with updating the original model, for example. The original model may be referred to as a first model, an original model, or an initial model (the in-flight model may also be referred to, therefore, as the second model).

Figure 13:
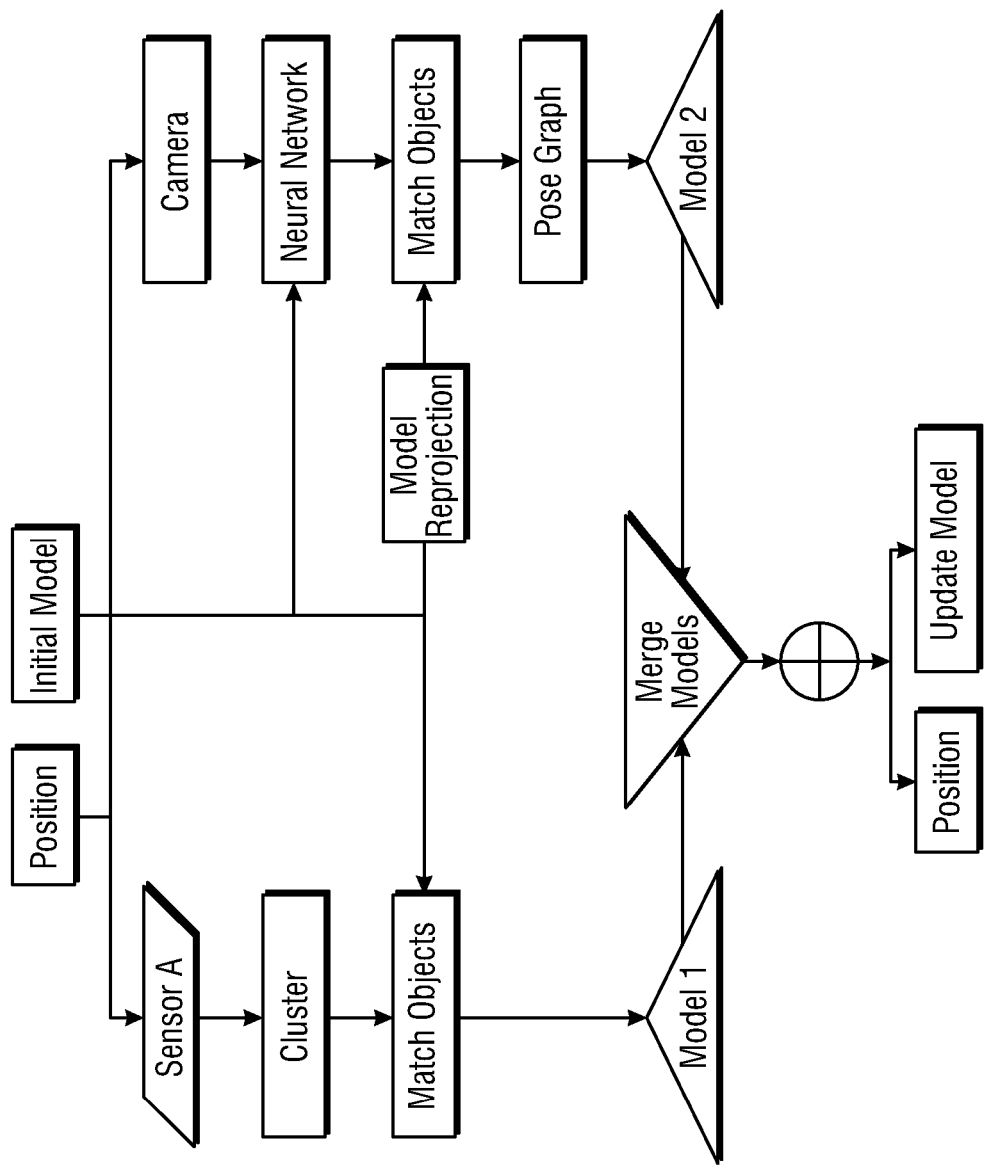
FIG. 13 shows a flow diagram of a process of generating and combining in-flight models according to some embodiments.

As mentioned above, FIG. 12 depicts an example flow diagram of a process of generating an in-flight model from combining two models generated using different data, along with the initial model (which may be the original model). This process may be implemented by the navigation program and may include combinations or more than two models (each of which may be generated using different sensor data to that shown in the figure). In some embodiments, such as that depicted in the diagram of FIG. 12, the in-flight model may be updated and new position information for the vehicle 1 may also be generated—which may be done alternately, for example. FIG. 13 shows a similar flow diagram with the specific example of the use of a skeletal model with mapping and localization processes as described herein.

The mapping and/or localization processes may occur in-flight and may use data which is not the most recent sensor data acquired. In some instances, the mapping and/or localization processes may use historic data from earlier in the same flight. In some embodiments, a flight may be reviewed in post-flight analysis which includes completion of the mapping and/or locations processes using sensor data from the flight. The results may then be used in future flights—e.g., to modify the original or initial model.

The in-flight model (and the original model) may include representations of one or more of a center location of the bottom of the object (e.g. a tower of the wind turbine) relative to the initial position of the autonomous vehicle, a height of the object (e.g. a height of a center of the wind turbine blades) relative to the initial position of the autonomous vehicle, the rotation position (e.g. in degrees) of a first part of the object 5 with respect to another part (such as a first blade from a vertical position), a heading from the initial position of the object 5 with respect to the initial position of the autonomous vehicle 1, and a blade center location (e.g. a distance of a center of the tower to the theoretical point where the blades meet).

Embodiments of the navigation program may use one or more different frames of reference during its execution. These frames of reference may include frames of reference of a geographically universal nature (e.g., longitude and latitude) or locally defined frames of reference with respect to the autonomous vehicle 1 and/or the object 5 or a part thereof.

The operations and processes of the navigation program may generally be separated into two parts—(i) location determining parts and (ii) inspection parts. Location determining parts include all of the processes which determine or refine the location and configuration of the object 5 with respect to the autonomous vehicle 1. The Inspection parts include the parts which are involved in inspection of the object 5 (including the control of the movement of the autonomous vehicle 1). The performance of these parts of the navigation program may generally be referred to as the "mission". Aspects of the operation of the autonomous vehicle 1 which are not directly associated with the mission may include preparatory processes (such as starting up the drive system 12, booting up any of the computers described herein, performing initial pre-flight safety checks, and performing any emergency post-mission or mid-mission actions. As will be understood, there may be pauses in the operation of the inspection parts of the operation of the navigation program following instances of the operation of the location determining parts (e.g., as changes are identified).

The navigation program may include an in-flight safety process. The in-flight safety process may be configured to execute whilst the navigation program is controlling movement of the autonomous vehicle 1. The in-flight safety process may be configured to determine whether there are any reasons why the flight cannot continue. If any such reasons are determined, then one or more emergency actions may be performed.

The in-flight safety process may, therefore, check a plurality of different aspects of the operation of one or more of the navigation program itself, the autonomous vehicle 1, the base station 2, and the operator interface device 4.

The in-flight safety process may include checking one or more of:
whether the sensor system 17 is operating correctly;
whether one or more of the sensors 171 is operating correctly (e.g., one sensor 171 which indicates a position of the autonomous vehicle 1 (e.g., with respect to the object 5) which is more than a predetermined threshold from that indicated by another sensor 171 (or an average of the position determined by multiple other sensors 171) may trigger an emergency action);
whether the inspection system 19 is operating correctly;
whether one or more inspection sensors 191 is operating correctly;
whether the power source 14 has sufficient power reserves to complete the flight plan;
whether there is a fault from the power source 14;
whether the flight control system 15 is operating correctly;
whether the navigation system 16 is operating correctly;
whether the drive system 12 is operating correctly;

whether the visual guidance system 20 is operating correctly; and whether the communication system 18 is operating correctly and/or whether communications are established with the base station 2 and/or the operator interface device 4, and/or the remote server 3.

On detecting a potential fault, the in-flight safety process is configured to determine if the fault will impact the completion or safe completion of the flight plan, and/or will impact the ability of the autonomous vehicle 1 to return to the home location, and/or will impact the ability of the autonomous vehicle 1 to land at another location (i.e., other than the home location).

The in-flight safety process may be configured to take a course of action based on this assessment. If the flight plan can be completed despite the detected fault (and the fault does not impact the operation of the inspection system 19), then the in-flight safety process may not interrupt the operation of the rest of the navigation program. In some such embodiments, an alert may be sent for display on the operator interface device 4 to notify the operator of the fault.

If the flight plan cannot be completed in light of the fault, then the in-flight safety process may be configured to determine a new flight plant to return the autonomous vehicle 1 to the home location ("RTL"—return to launch). This process may include determining one or more transition locations. In some embodiments, the in-flight safety process may determine whether the new flight plan (an emergency return to home flight plan) is a safe flight path for the autonomous vehicle 1—i.e., that the path is not likely to cause the autonomous vehicle 1 to impact the object 5 or another object (other than the object 5). If the flight path is safe to complete, then the in-flight safety process may cause the autonomous vehicle 1 to travel along the emergency return to home flight plan to land at the home location. In some such embodiments, an alert may be sent for display on the operator interface device 4 to notify the operator of the action taken.

If the in-flight safety process cannot determine a safe flight plan to return the autonomous vehicle 1 to the home location and/or the process determines that the autonomous vehicle 1 cannot reach the home location (e.g., due to inadequate power), then the in-flight safety process may determine a new flight path to a different location (other than the home location). This process may include determining one or more transition locations. In some embodiments, the in-flight safety process may determine whether the new flight plan (an emergency landing flight plan) is a safe flight path for the autonomous vehicle 1—i.e., that the path is not likely to cause the autonomous vehicle 1 to impact the object 5 or another object (other than the object 5). If the flight path is safe to complete, then the in-flight safety process may cause the autonomous vehicle 1 to travel along the emergency landing flight plan to land the autonomous vehicle 1 at the other location. In some such embodiments, an alert may be sent for display on the operator interface device 4 to notify the operator of the action taken.

If the in-flight safety process cannot cause the landing, or cannot cause the safe landing of, the autonomous vehicle 1 at another location, then the in-flight safety process may send an alert for display on the operator interface device 4 to notify the operator that the operator should use the operator interface device 4 to take manual control of the flight of the autonomous vehicle 1. The operator may input one or more commands via the interface 42 which are sent to the autonomous vehicle 1 (directly or via the base station 2) and which are then used to control the operation of the drive system 12 to control the movement of the autonomous vehicle 1.

In accordance with some embodiments, the operator interface device 4 is configured to receive a command from the operator (e.g., via the interface 42) indicating that the operator will take manual control of the autonomous vehicle 1—in much the same manner as described above but without requiring the detection of a fault.

As will be appreciated, the references to a flight plan or flight path are references to a navigation plan or path and are likewise references to an inspection plan or inspection path.

Figure 9:
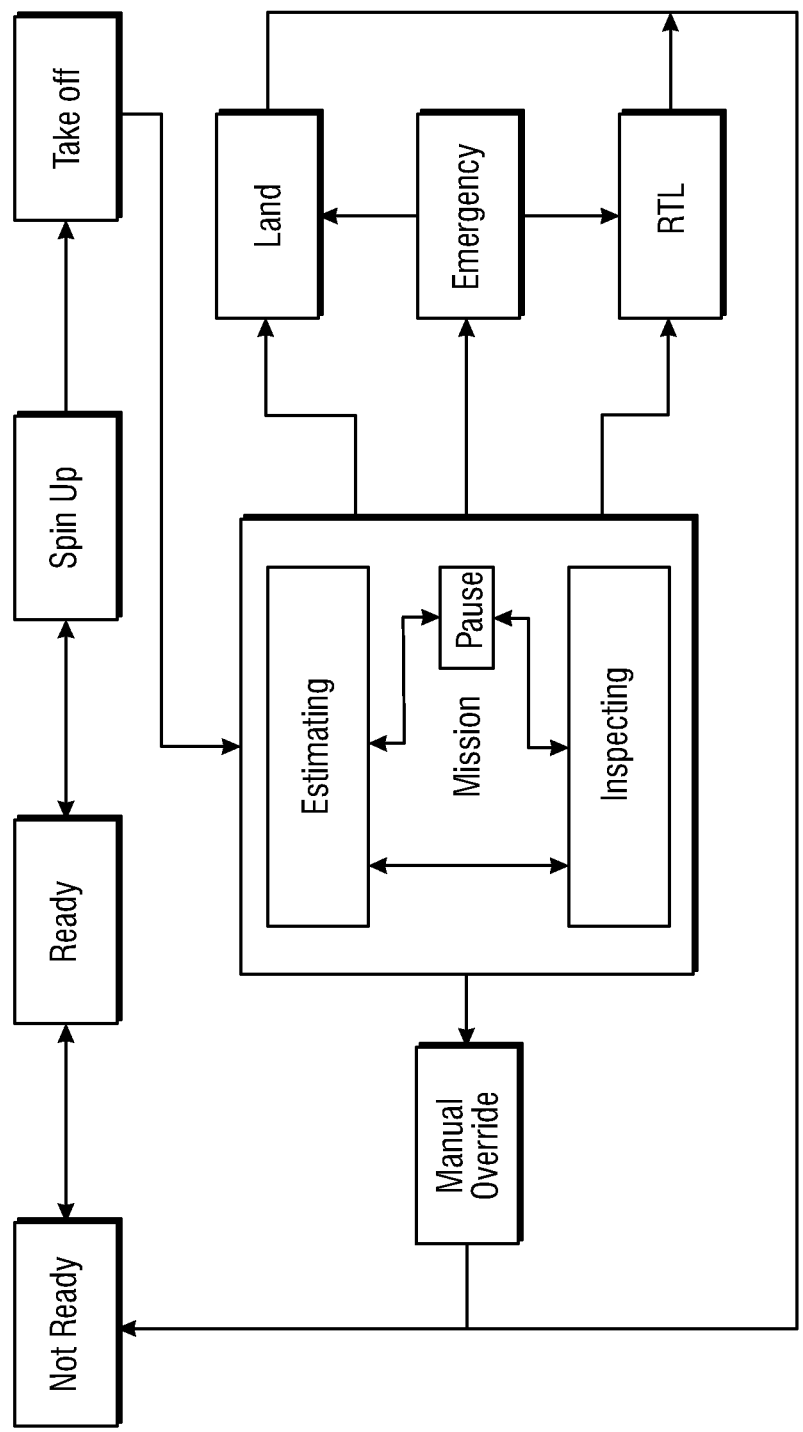
FIG. 9 shows a state flow according to some embodiments.

The operations of the navigation program of some embodiments are shown in FIG. 9 for ease of reference—which shows a state flow.

As will be understood, the navigation program provides an updated in-flight model which is used during flight of the autonomous vehicle 1 to control the flight of the vehicle 1. The flight plan itself may not substantially change in some embodiments but may be shifted in space as the actual location of the object 5 is refined within the model. However, as will be appreciated, this shifting of the flight plan does constitute a change in the flight plan as well as in the model during flight.

The autonomous vehicle 1, as will be understood, follows a flight plan (which may be updated in-flight) which causes the autonomous vehicle 1 to move between at least two inspection locations (a first inspection location and a second inspection location). At each inspection location, the inspection system 19 is used to inspect the object 5.

The inspection system computer 192 may be provided with information concerning the inspection locations. This information may include a distance between the inspection system 19 (and, in particular, the or each inspection sensor 191 such as a camera 191a). The information is, therefore, referred to as inspection location data.

The inspection system computer 192 may be configured to control the operation of the one or more inspection sensors 191 (such as a camera 191a) in order to ensure that the object 5 is inspected by the or each inspection sensor 191 accurately. In some embodiments, the inspection system computer 192 may be configured to control the operation of the one or more inspection sensors 191 based on the inspection location data.

In some embodiments, this process includes the inspection system computer 192 determining one or more inspection system parameters based on the inspection location data. In some instances, however, the inspection location data includes the one or more inspection system parameters. The one or more inspection system parameters include parameters which are used to configure at least one of the one or more inspection sensors 191. The or each inspection system parameter may include, for example, (e.g., in the case of a camera 191a) focus setting (such as a focal distance), a shutter speed, an aperture size, and the like.

As will be appreciated, the inspection location data may vary from one inspection location to another. In particular, the inspection location data for the first inspection location may be different to the inspection location data for the second inspection location. Likewise, there may be more inspection locations and each may have different inspection location data to another inspection location.

The inspection locations form a sequence in accordance with the flight plan (and may be interspersed with transition locations, as described herein).

The inspection system computer 192 may be configured to control the operation of the or each inspection sensor 191 using the inspection location data (and the or each inspection system parameter) as the autonomous vehicle 1 moves between inspection locations. In particular, as the autonomous vehicle 1 moves towards an inspection location, the inspection system computer 192 may control the or each inspection sensor 191 such that the or each inspection sensor 191 is configured to perform an inspection operation on the object 5 when the autonomous vehicle 1 arrives at that inspection location. In other words, the inspection system computer 192 may have configured the or each inspection sensor 191 to inspect the object 5 at the first inspection location using first inspection location data (and one or more first inspection system parameters). After the inspection system 19 has been used in a first inspection operation at the first inspection location, the autonomous vehicle 1 commences movement towards the second inspection location (e.g., directly or via one or more transition locations ("towards" in this instance being in accordance with the flight plan determined sequence)). After the inspection system 19 has completed the first inspection operation, the inspection system computer 192 may be configured to control the operation of the or each inspection sensor 191 to configure the or each inspection sensor 191 using the second inspection location data (and one or more second inspection system parameters). As or before the autonomous vehicle 1 arrives at the second inspection location, the or each inspection sensor 191 is, therefore, configured for a second inspection operation at the second inspection location. This process reduces the amount of time the autonomous vehicle 1 must remain at each inspection location.

In some embodiments, the or each inspection system parameter may be refined at the inspection location based one or more sensed parameters at the inspection location (e.g., sensed by one or more of the inspection sensors 191 and/or one or more sensors 171 of the sensor system 17). Thus, for example, a more precise (or actual) distance of the autonomous vehicle 1 (and so the inspection sensor 19) from the object 5 may be determined at the inspection location. As will be appreciated, as this may be fine tuning of the configuration of the or each inspection sensor 191, the majority of any configuration may have occurred as the autonomous vehicle 1 was still moving. Thus, this process may still reduce the amount of time the autonomous vehicle 1 must remain at each inspection location.

In some embodiments, the inspection system 19 is configured to store the inspection data (under the control of the inspection system computer 192) in the storage medium 192a after the or each inspection operation. In some embodiments, the inspection system 19 is configured to send the inspection data to the communication system 18 (e.g., to one or more of the communication interfaces 181) for transmission from the autonomous vehicle 1 (e.g., to the base station 2, the remote server 3, and/or the operator interface device 4).

The inspection system computer 192 may be configured to determine whether to send the inspection data (e.g., after an inspection operation at an inspection location) to the communication system 18 based at least in part on the flight plan. In some embodiments, the inspection system computer 192 is configured to determine whether to send the inspection data based on one or more of the expected length of time to travel to the next inspection location, the volume of inspection data collated for the last inspection operation (and/or any other inspection operations for which the inspection data has not yet been sent), the transmission rate available using the communication system 18 (and, e.g., one or more of the communication interfaces 181 for use in the sending of the inspection data), and the availability or signal strength of the one or more communication interfaces 181 for use in sending of the inspection data. Accordingly, the inspection data 19 may be sent from the autonomous vehicle 1 during appropriate portions of the flight of the autonomous vehicle 1. This may make more efficient use of available resources on the autonomous vehicle 1 and, for example, decrease the time which may otherwise be required to extract the inspection data from the autonomous vehicle 1.

In some embodiments, the communication system 18 is configured to determine if and when to send the inspection data from the autonomous vehicle 1—in the same manner as described above—and may, therefore, be configured to request inspection data from the inspection system 19 when required.

As will be appreciated, therefore, in some embodiments, the inspection system 19 is configured to perform the following operations:

a configuration operation (to configure the or each inspection sensor 191 to perform the inspection operation);

the inspection operation (to capture the inspection data); and a send/store operation (to send and/or store the inspection data).

As will also be appreciated, the configuration operation may be undertaken (at least partially, if not entirely) during flight to an inspection location). The inspection operation occurs at the inspection location and the send/store operation may occur at least partially during flight to another inspection or transition location. In some embodiments, the send/store operation occurs at least partially whilst the autonomous vehicle 1 is at an inspection location (and may, therefore, overlap with the inspection operation in terms of when they are performed).

The operations above in relation to the inspection system computer 192 may be undertaken in accordance with an inspection system program which may be configured for execution by the inspection system computer 192. This program need not, in some embodiments, be executed by the inspection system computer 192 but could be executed by another computer (e.g., such as one of the other computers described herein).

The autonomous vehicle 1 may be a rotorcraft such as a helicopter which may be a multirotor helicopter (e.g., helicopter having two or more rotors providing lift and maneuvering forces). The autonomous vehicle 1 may be a fixed wing aircraft (which may be a glider or a powered aircraft). The autonomous vehicle 1 may be an aerostat (such as an airship). The autonomous vehicle 1 may be a ground vehicle which includes at least one ground engaging member—such as a wheel or track—and which is configured to be driven across a ground surface. The autonomous vehicle 1 may be a watercraft, such as a boat or submarine. The autonomous vehicle may be an amphibious vehicle, for example, which is configured to travel through water and across a ground surface—such as a hovercraft, for example. As will be appreciated, embodiments of the present invention are applicable to different types of vehicle and the above described embodiments could be implemented in relation to any such autonomous vehicle 1.

Whilst embodiments have been described in relation to autonomous vehicles 1, it will be appreciated that the processes of mapping and localization can be applied to other fields (i.e., other than navigating an autonomous vehicle 1). For example, the mapping and localization processes described in relation to the skeletal model may be used in relation to a mobile device which includes an imaging sensor configured to generate image data. The device may further include a pose sensor configured to determine a pose of the device and/or camera (or other sensor)—this may include one or more accelerometers and/or radio navigation sensors, for example. The mobile device may, therefore, be configured to determine its pose using input image data captured by the imaging sensor and using a model of the object, a part thereof, and/or at least a part of the local environment. In order to achieve this, the device may execute the mapping and/or localization processes for skeletal models as described herein.

The mobile device may be a portable device which is configured to be carried by a human user, for example. This may include a mobile telephone, a tablet computer, an augmented reality headset (or handset), or the like.

In relation to an augmented reality headset (or handset), the device may be configured to overlay information on a screen of the device through which the user can view the local environment and/or at least part the object. The positioning of the overlaid information and/or the information content may be determined, at least in part, by the location of the device and the environment or object visible to the user through the screen.

In some embodiments, the overlaid information may include navigational information directing the user to travel in a particular direction based on the location of the device.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

Although certain example embodiments of the invention have been described, the scope of the appended claims is not intended to be limited solely to these embodiments. The claims are to be construed literally, purposively, and/or to encompass equivalents.

Representative features are set out in the following clauses (labelled as "aspects"), which stand alone or may be combined, in any combination, with one or more features disclosed in the text and/or drawings of the specification.

Aspects

A1. A navigation program for an autonomous vehicle, the navigation program configured to:
  determine an initial inspection plan for an autonomous vehicle to inspect an object based on an initial model of the object;
  control movement of the autonomous vehicle in accordance with the initial inspection plan;
  receive sensor data from a sensor system during movement of the autonomous vehicle in accordance with the initial inspection plan;
  generate an in-flight model of the object based on the received sensor data; and
  generate an updated inspection plan using the in-flight model and the initial inspection plan.

A2. A navigation program according to aspect A1, further configured to:
  receive an initial model of the object to be inspected by the autonomous vehicle;
  identify an inspection target associated with the initial model of the object; and
  determine an inspection location for the autonomous vehicle from which inspection target is inspectable by an inspection system of the autonomous vehicle, wherein the initial model includes one or more convex shapes representing the object and the initial inspection plan includes the inspection location.

A3. A navigation program according to aspect A1 or A2, wherein the received sensor data is generated by a ranging sensor of the sensor system.

A4. A navigation program according to aspect A3, wherein the ranging sensor is a LiDAR sensor.

A5. A navigation program according to any preceding aspect, further configured to generate the in-flight model at least in part by clustering the sensor data and associating one or more geometric shapes with the clustered sensor data.

A6. A navigation program according to any preceding aspect, further configured to generate the in-flight model at least in part by use of an iterative closest point technique using sensor data in the form of a point cloud.

A7. A navigation program according to any preceding aspect, further configured to merge a plurality of in-flight models to arrive at the in-flight model.

A8. A navigation method for an autonomous vehicle, the navigation method including:
  determining an initial inspection plan for an autonomous vehicle to inspect an object based on an initial model of the object;
  controlling movement of the autonomous vehicle in accordance with the initial inspection plan;
  receiving sensor data from a sensor system during movement of the autonomous vehicle in accordance with the initial inspection plan;
  generating an in-flight model of the object based on the received sensor data; and
  generating an updated inspection plan using the in-flight model and the initial inspection plan.

A9. A navigation method according to aspect A8, further including:
  receiving an initial model of the object to be inspected by the autonomous vehicle;
  identifying an inspection target associated with the initial model of the object; and
  determining an inspection location for the autonomous vehicle from which inspection target is inspectable by an inspection system of the autonomous vehicle, wherein the initial model includes one or more convex shapes representing the object and the initial inspection plan includes the inspection location.

A10. A navigation method according to aspect A8 or A9, wherein the received sensor data is generated by a ranging sensor of the sensor system.

A11. A navigation method according to aspect A10, wherein the ranging sensor is a LiDAR sensor.

A12. A navigation method according to any of aspects A8 to A11, further including generating the in-flight model at least in part by clustering the sensor data and associating one or more geometric shapes with the clustered sensor data.

A13. A navigation method according to any of aspects A8 to A12, further including generating the in-flight model at least in part by use of an iterative closest point technique using sensor data in the form of a point cloud.

A14. A navigation method according to any of aspects A8 to A13, further including merging a plurality of in-flight models to arrive at the in-flight model.

A15. A navigation system for an autonomous vehicle, the navigation system configured to:
determine an initial inspection plan for an autonomous vehicle to inspect an object based on an initial model of the object;
control movement of the autonomous vehicle in accordance with the initial inspection plan;
receive sensor data from a sensor system during movement of the autonomous vehicle in accordance with the initial inspection plan;
generate an in-flight model of the object based on the received sensor data; and
generate an updated inspection plan using the in-flight model and the initial inspection plan.

A16. A navigation system according to aspect A15, further configured to:
receive an initial model of the object to be inspected by the autonomous vehicle;
identify an inspection target associated with the initial model of the object; and
determine an inspection location for the autonomous vehicle from which inspection target is inspectable by an inspection system of the autonomous vehicle, wherein the initial model includes one or more convex shapes representing the object and the initial inspection plan includes the inspection location.

A17. A navigation system according to aspect A15 or A16, wherein the received sensor data is generated by a ranging sensor of the sensor system.

A18. A navigation system according to aspect A17, wherein the ranging sensor is a LiDAR sensor.

A19. A navigation system according to any of aspects A15 to A18, further configured to generate the in-flight model at least in part by clustering the sensor data and associating one or more geometric shapes with the clustered sensor data.

A20. A navigation system according to any of aspects A15 to A19, further configured to generate the in-flight model at least in part by use of an iterative closest point technique using sensor data in the form of a point cloud.

A21. A navigation system according to any of aspects A15 to A20, further configured to merge a plurality of in-flight models to arrive at the in-flight model.

A22. An autonomous vehicle including a navigation program according to any of aspects A1 to A7 or a navigation system according to any of aspects A15 to A21.

B1. An inspection system program for an autonomous vehicle with an inspection system for use in inspecting an object, the inspection system program configured to:
receive an inspection plan indicating at least two inspection locations and inspection location data associated with each inspection location; and
control operation of the inspection system to configure one or more inspection sensors of the inspection system based on the inspection location data as the autonomous vehicle moves between the at least two inspection locations, such that the or each inspection sensor is configured to inspect the object at each inspection location.

B2. An inspection method for an autonomous vehicle with an inspection system for use in inspecting an object, the inspection method including:
receiving an inspection plan indicating at least two inspection locations and inspection location data associated with each inspection location;
controlling operation of the inspection system to configure one or more inspection sensors of the inspection system based on the inspection location data as the autonomous vehicle moves between the at least two inspection locations, such that the or each inspection sensor is configured to inspect the object at each inspection location.

B3. An inspection system for an autonomous vehicle with an inspection system for use in inspecting an object, the inspection system configured to:
receive an inspection plan indicating at least two inspection locations and inspection location data associated with each inspection location; and
control operation of the inspection system to configure one or more inspection sensors of the inspection system based on the inspection location data as the autonomous vehicle moves between the at least two inspection locations, such that the or each inspection sensor is configured to inspect the object at each inspection location.

B4. An autonomous vehicle including an inspection system program according to aspect B1 or an inspection system according to aspect B3.

C1. A navigation program for an autonomous vehicle with an inspection system for use in inspecting an object, the navigation program configured to:
receive a nominal model of the object;
receive one or more parameters associated with the nominal model to define an initial model of the object;
provide navigation instructions to control the operation of the vehicle;
receive sensor data representing at least part of the object;
analyze the sensor data to determine an in-flight model by adjusting one or more parameters associated with the nominal model.

C2. A navigation method for an autonomous vehicle with an inspection system for use in inspecting an object, the navigation method including:
receiving a nominal model of the object;
receiving one or more parameters associated with the nominal model to define an initial model of the object;
providing navigation instructions to control the operation of the vehicle;
receiving sensor data representing at least part of the object;
analyzing the sensor data to determine an in-flight model by adjusting one or more parameters associated with the nominal model.

C3. A navigation system for an autonomous vehicle with an inspection system for use in inspecting an object, the navigation system configured to:
receive a nominal model of the object;
receive one or more parameters associated with the nominal model to define an initial model of the object;

provide navigation instructions to control the operation of the vehicle;
receive sensor data representing at least part of the object;
analyze the sensor data to determine an in-flight model by adjusting one or more parameters associated with the nominal model.

C4. An autonomous vehicle including a navigation program according to aspect C1 or a navigation system according to aspect C3.

D1. A navigation program for an autonomous vehicle with an inspection system for use in inspecting an object, the navigation program configured to:
receive sensor data from a plurality of different sensors, the sensor data representing at least part of the object;
cluster the sensor data based on an initial model of the object;
determine the relative position of one or more parts of the object with respect to each other or determine a position of the object with respect to the vehicle; and
update the initial model using the determined position or determined relative position.

D2. A navigation method for an autonomous vehicle with an inspection system for use in inspecting an object, the navigation method including:
receiving sensor data from a plurality of different sensors, the sensor data representing at least part of the object;
clustering the sensor data based on an initial model of the object;
determining the relative position of one or more parts of the object with respect to each other or determine a position of the object with respect to the vehicle; and
updating the initial model using the determined position or determined relative position.

D3. A navigation system for an autonomous vehicle with an inspection system for use in inspecting an object, the navigation system configured to:
receive sensor data from a plurality of different sensors, the sensor data representing at least part of the object;
cluster the sensor data based on an initial model of the object;
determine the relative position of one or more parts of the object with respect to each other or determine a position of the object with respect to the vehicle; and
update the initial model using the determined position or determined relative position.

D4. An autonomous vehicle including a navigation program according to aspect D1 or a navigation system according to aspect D3.

E1. A navigation program for an autonomous vehicle with an inspection system for use in inspecting an object, the navigation program configured to:
use an initial model of the object to instruct the movement of the vehicle with respect to the object;
generate a plurality of in-flight models of the object using sensor data from a plurality of different sensors collected during movement of the vehicle with respect to the object;
combine the plurality of in-flight models; and
update the initial model using the combined plurality of in-flight models.

E2. A navigation method for an autonomous vehicle with an inspection system for use in inspecting an object, the navigation method including:
using an initial model of the object to instruct the movement of the vehicle with respect to the object;
generating a plurality of in-flight models of the object using sensor data from a plurality of different sensors collected during movement of the vehicle with respect to the object;
combining the plurality of in-flight models; and
updating the initial model using the combined plurality of in-flight models.

E3. A navigation system for an autonomous vehicle with an inspection system for use in inspecting an object, the navigation system configured to:
use an initial model of the object to instruct the movement of the vehicle with respect to the object;
generate a plurality of in-flight models of the object using sensor data from a plurality of different sensors collected during movement of the vehicle with respect to the object;
combine the plurality of in-flight models; and
update the initial model using the combined plurality of in-flight models.

E4. An autonomous vehicle including a navigation program according to aspect E1 or a navigation system according to aspect E3.

F1. A navigation program for an autonomous vehicle, the navigation program configured to:
receive an initial model of an object to be inspected by the autonomous vehicle;
identify an inspection target associated with the initial model of the object; and
determine an inspection location for the autonomous vehicle from which inspection target is inspectable by an inspection system of the autonomous vehicle, wherein the initial model includes one or more shapes representing the object which permit a projection from the inspection location to the inspection target to be determined.

F2. A navigation program according to aspect F1, wherein the representation of the object in the initial model includes one or more convex shapes.

F3. A navigation program according to aspect F1 or F2, further configured to determine a plurality of inspection locations from which the inspection target is inspectable.

F4. A navigation program according to any preceding aspect F1 to F3, further configured to determine one or more inspection locations for the autonomous vehicle from which one or more further inspection targets are inspectable by the inspection system.

F5. A navigation program according to aspect F4, further configured to determine a plurality of inspection plans in which each inspection target is inspected, optionally further configured to check that each of the inspection plans does not violate one or more constraints, and/or optionally further configured to alter one or more of the inspection plans.

F6. A navigation program according to aspect F5, further configured to cost the inspection plans in relation to a cost criterion to determine a lowest cost inspection plan.

F7. A navigation program according to any preceding aspect, further configured to:
determine an initial inspection plan for an autonomous vehicle to inspect an object based on the initial model of the object, the initial inspection plan including the inspection location;
control movement of the autonomous vehicle in accordance with the initial inspection plan;
receive sensor data from a sensor system during movement of the autonomous vehicle in accordance with the initial inspection plan;
generate an in-flight model of the object based on the received sensor data; and
generate an updated inspection plan using the in-flight model and the initial inspection plan.

F8. A navigation method for an autonomous vehicle, the navigation method including:
receiving an initial model of an object to be inspected by the autonomous vehicle;
identifying an inspection target associated with the initial model of the object; and
determining an inspection location for the autonomous vehicle from which inspection target is inspectable by an inspection system of the autonomous vehicle, wherein the initial model includes one or more convex shapes representing the object.

F9. A navigation method according to aspect F8, wherein the representation of the object in the initial model includes only convex shapes.

F10. A navigation method according to aspect F8 or F9, further including determining a plurality of inspection locations from which the inspection target is inspectable.

F11. A navigation method according to any of aspects 8 to 10, further including determining one or more inspection locations for the autonomous vehicle from which one or more further inspection targets are inspectable by the inspection system.

F12. A navigation method according to aspect F11, further including determining a plurality of inspection plans in which each inspection target is inspected, optionally further including checking that each of the inspection plans does not violate one or more constraints, and/or optionally further including altering one or more of the inspection plans.

F13. A navigation method according to aspect F12, further including costing the inspection plans in relation to a cost criterion to determine a lowest cost inspection plan.

F14. A navigation method according to any of aspects F8 to F13, further including:
determining an initial inspection plan for an autonomous vehicle to inspect an object based on the initial model of the object, the initial inspection plan including the inspection location;
controlling movement of the autonomous vehicle in accordance with the initial inspection plan;
receiving sensor data from a sensor system during movement of the autonomous vehicle in accordance with the initial inspection plan;
generating an in-flight model of the object based on the received sensor data; and
generating an updated inspection plan using the in-flight model and the initial inspection plan.

F15. A navigation system for an autonomous vehicle, the navigation system configured to:
receive an initial model of an object to be inspected by the autonomous vehicle;
identify an inspection target associated with the initial model of the object; and
determine an inspection location for the autonomous vehicle from which inspection target is inspectable by an inspection system of the autonomous vehicle, wherein the initial model includes one or more shapes representing the object which permit a projection from the inspection location to the inspection target to be determined.

F16. A navigation system according to aspect F15, wherein the representation of the object in the initial model includes one or more convex shapes.

F17. A navigation system according to aspect F15 or F16, further configured to determine a plurality of inspection locations from which the inspection target is inspectable.

F18. A navigation system according to any of aspects F15 to F17, further configured to determine one or more inspection locations for the autonomous vehicle from which one or more further inspection targets are inspectable by the inspection system.

F19. A navigation system according to aspect F18, further configured to determine a plurality of inspection plans in which each inspection target is inspected.

F20. A navigation system according to aspect F19, further configured to check that each of the inspection plans does not violate one or more constraints.

F21. A navigation system according to aspect F20, further configured to alter one or more of the inspection plans.

F22. A navigation system according to aspect F20 or F21, further configured to cost the inspection plans in relation to a cost criterion to determine a lowest cost inspection plan.

F23. A navigation system according to any of aspects F15 to F22, further configured to:
determine an initial inspection plan for an autonomous vehicle to inspect an object based on the initial model of the object, the initial inspection plan including the inspection location;
control movement of the autonomous vehicle in accordance with the initial inspection plan;
receive sensor data from a sensor system during movement of the autonomous vehicle in accordance with the initial inspection plan;
generate an in-flight model of the object based on the received sensor data; and
generate an updated inspection plan using the in-flight model and the initial inspection plan.

F24. An autonomous vehicle including a navigation program according to any of aspects F1 to F7 or a navigation system according to any of aspects F15 to F23.

G1. A pose optimization process to optimize an approximate pose of a sensor with respect to an object using sensor data, the process comprising:
receiving a model of an object;
receiving sensor data relating to at least part of the object, the sensor data being in a sensor frame of reference, the sensor data being associated with pose data representing a pose of a sensor used to generate the sensor data;
projecting at least part of the model onto the sensor frame of reference;
identifying corresponding feature points and/or feature lines between the model and sensor data in the sensor frame of reference; and
optimizing the pose data based on the identified correspondence, using a location difference in the corresponding feature points and/or feature lines between the model and the sensor data in the sensor frame of reference.

G2. A mapping and/or localization process including:
a pose optimization process according to aspect G1; and
optimizing at least one parameter of the model of the object, wherein the at least one parameter defines an estimated configuration of the object, and wherein optimizing the at least one parameter includes optimizing the at least one parameter based on the correspondence between the feature points and/or feature lines and the optimized pose data, such that the optimized parameter represents the configuration of the object.

G3. A mapping and/or localization process according to aspect G2, wherein the optimization of the at least one parameter and the optimizing of the data representing the pose of the sensor occur substantially simultaneously.

G4. A mapping and/or localization process according to aspect G2 or G3, further including processing the sensor data prior to projecting at least part of the mode into the sensor frame of reference, wherein processing the sensor data comprises passing the sensor data through a convolutional neural network with a convolutional-deconvolutional architecture to generate output sensor data, and wherein identifying corresponding feature points and/or feature lines between the model and sensor data in the sensor frame of reference includes identifying corresponding feature points and/or feature lines using the model and the output sensor data.

G5. A mapping and/or localization process according to aspect G4, wherein the output sensor data represents, at least in part, a skeletal representation of the object.

G6. A mapping and/or localization process according to any of aspects G2 to G5, wherein the optimization of the at least one parameter and the optimizing of the data representing the pose of the sensor are iterative optimization processes using a cost function.

G7. A mapping and/or localization process according to any of aspects G2 to G6, wherein the sensor data relating to at least part of the object is multi-channel sensor data and includes a projection of the model onto the sensor frame of reference.

G8. A mapping and/or localization process according to any of aspects G2 to G7, further including:
determining the at least one parameter defining the estimated configuration of the object using a different model of the object.

G9. A mapping and/or localization process according to any of aspects G2 to G8, wherein identifying corresponding feature points and/or feature lines between the model and sensor data in the sensor frame of reference includes defining a search region around a feature point identified in the model and searching the search region.

G10. A mapping and/or localization process according to any of aspects G2 to G9, wherein identifying corresponding feature points and/or feature lines between the model and sensor data in the sensor frame of reference includes defining one or more line points along a feature line identified in the model, defining search line and direction, and searching in accordance with the search line and search direction for one or more respective corresponding line points.

G11. A mapping and/or localization process according to any of aspects G2 to G10, wherein the sensor data includes image data.

G12. A pose optimization program stored as computer executable instructions on a computer readable medium which, when executed, cause the performance of the process of aspect G1.

G13. A mapping and/or localization program stored as computer executable instructions on a computer readable medium which, when executed, cause the performance of the process of any of aspects G2 to G11.

G14. A navigation process for an autonomous vehicle, the navigation process including:
performing a process according to any of aspects G1 to G11; and
defining or modifying a navigation plan using the optimized pose data.

G15. A navigation process according to aspect G14, wherein using the optimized pose data includes the mapping and/or localization process of any of aspects G2 to G11.

G16. A navigation program for an autonomous vehicle, the navigation program stored as computer executable instructions on a computer readable medium which, when executed, cause the performance of the process of aspect G14 or G15.

G17. An autonomous vehicle including a program according to any of aspects G12, G13, G15, or G16.

The invention claimed is:

1. A pose optimization process to optimize an approximate pose of a sensor with respect to an object using sensor data, the process comprising:
receiving a model of an object;
receiving sensor data relating to at least part of the object, the sensor data being in a sensor frame of reference, the sensor data being associated with pose data representing a pose of a sensor used to generate the sensor data;
projecting at least part of the model onto the sensor frame of reference;
identifying corresponding feature points and/or feature lines between the model and sensor data in the sensor frame of reference, wherein identifying corresponding feature points and/or feature lines between the model and sensor data in the sensor frame of reference includes defining a search region around a feature point identified in the model and searching the search region; and
optimizing the pose data based on the identified correspondence, using a location difference in the corresponding feature points and/or feature lines between the model and the sensor data in the sensor frame of reference.

2. A non-transitory computer readable medium storing a pose optimization program which, when executed, causes performance of the process of claim 1.

3. A pose optimization process to optimize an approximate pose of a sensor with respect to an object using sensor data, the process comprising:
receiving a model of an object;
receiving sensor data relating to at least part of the object, the sensor data being in a sensor frame of reference, the sensor data being associated with pose data representing a pose of a sensor used to generate the sensor data;
processing the sensor data including passing the sensor data through a convolutional neural network with a convolutional-deconvolutional architecture to generate output sensor data;

projecting, after the processing of the sensor data, at least part of the model onto the sensor frame of reference;

identifying corresponding feature points and/or feature lines between the model and sensor data in the sensor frame of reference, wherein identifying corresponding feature points and/or feature lines between the model and sensor data in the sensor frame of reference includes identifying corresponding feature points and/or feature lines using the model and the output sensor data;

optimizing the pose data based on the identified correspondence, using a location difference in the corresponding feature points and/or feature lines between the model and the sensor data in the sensor frame of reference; and optimizing at least one parameter of the model of the object, wherein the at least one parameter defines an estimated configuration of the object, and wherein optimizing the at least one parameter includes optimizing the at least one parameter based on the correspondence between the feature points and/or feature lines and the optimized pose data, such that the optimized parameter represents the configuration of the object.

4. The pose optimization process according to claim 3, wherein the optimization of the at least one parameter and the optimizing of the data representing the pose of the sensor occur substantially simultaneously.

5. The pose optimization process according to claim 3, wherein the output sensor data represents, at least in part, a skeletal representation of the object.

6. The pose optimization process according to claim 3, wherein the optimization of the at least one parameter and the optimizing of the data representing the pose of the sensor are iterative optimization processes using a cost function.

7. The pose optimization process according to claim 3, wherein the sensor data relating to at least part of the object is multi-channel sensor data and includes a projection of the model onto the sensor frame of reference.

8. The pose optimization process according to claim 3, further including:

determining the at least one parameter defining the estimated configuration of the object using a different model of the object.

9. The pose optimization process according to claim 3, wherein identifying corresponding feature points and/or feature lines between the model and sensor data in the sensor frame of reference includes defining a search region around a feature point identified in the model and searching the search region.

10. The pose optimization process according to claim 3, wherein identifying corresponding feature points and/or feature lines between the model and sensor data in the sensor frame of reference includes defining one or more line points along a feature line identified in the model, defining search line and direction, and searching in accordance with the search line and search direction for one or more respective corresponding line points.

11. The pose optimization process according to claim 3, wherein the sensor data includes image data.

12. A non-transitory computer readable medium storing a pose optimization program which, when executed, causes performance of the process of claim 3.

13. The pose optimization process according to claim 3, wherein the configuration of the object includes the relative position of parts of the object with respect to each other, wherein the parts of the object are moveable with respect to each other.

14. A navigation process for an autonomous vehicle, the navigation process including:

receiving a model of an object;

receiving sensor data relating to at least part of the object, the sensor data being in a sensor frame of reference, the sensor data being associated with pose data representing a pose of a sensor used to generate the sensor data;

projecting at least part of the model onto the sensor frame of reference;

identifying corresponding feature points and/or feature lines between the model and sensor data in the sensor frame of reference, wherein identifying corresponding feature points and/or feature lines between the model and sensor data in the sensor frame of reference includes defining one or more line points along a feature line identified in the model, defining search line and direction, and searching in accordance with the search line and search direction for one or more respective corresponding line points;

optimizing the pose data based on the identified correspondence, using a location difference in the corresponding feature points and/or feature lines between the model and the sensor data in the sensor frame of reference; and defining or modifying a navigation plan using the optimized pose data.

15. A non-transitory computer readable medium storing a navigation program for an autonomous vehicle which, when executed, causes performance of the process of claim 14.

* * * * *